US009088160B2

(12) United States Patent
Yang et al.

(10) Patent No.: US 9,088,160 B2
(45) Date of Patent: Jul. 21, 2015

(54) LOAD RESTORATION FOR FEEDER AUTOMATION IN ELECTRIC POWER DISTRIBUTION SYSTEMS

(75) Inventors: Fang Yang, Raleigh, NC (US); Vaibhav Donde, Raleigh, NC (US); Zhenyuan Wang, Cary, NC (US); James Stoupis, Durham, NC (US); David Lubkeman, Cary, NC (US)

(73) Assignee: ABB Research Ltd., Zurich (CH)

( * ) Notice: Subject to any disclaimer, the term of this patent is extended or adjusted under 35 U.S.C. 154(b) by 1191 days.

(21) Appl. No.: 12/747,155

(22) PCT Filed: Dec. 10, 2008

(86) PCT No.: PCT/US2008/086175
§ 371 (c)(1),
(2), (4) Date: Sep. 22, 2010

(87) PCT Pub. No.: WO2009/076410
PCT Pub. Date: Jun. 18, 2009

(65) Prior Publication Data
US 2011/0029148 A1 Feb. 3, 2011

Related U.S. Application Data

(60) Provisional application No. 61/012,969, filed on Dec. 12, 2007.

(51) Int. Cl.
*G05D 3/12* (2006.01)
*G05D 5/00* (2006.01)
(Continued)

(52) U.S. Cl.
CPC . *H02H 7/28* (2013.01); *H02H 3/06* (2013.01);
*H02H 3/265* (2013.01); *Y04S 10/30* (2013.01);
*Y04S 10/52* (2013.01); *Y04S 10/522* (2013.01);
*Y04S 10/525* (2013.01)

(58) Field of Classification Search
CPC ............ H02H 7/28; H02H 3/06; Y04S 10/52;
Y04S 10/522; Y04S 10/525; Y04S 10/30
USPC ....................... 700/286, 292, 293; 361/62–64
See application file for complete search history.

(56) References Cited

U.S. PATENT DOCUMENTS 3,668,351 A 6/1972 Walbrun
5,303,112 A 4/1994 Zulaski
(Continued)

FOREIGN PATENT DOCUMENTS

CA 2589635 11/2007
WO 2009076410 6/2009

OTHER PUBLICATIONS

International Searching Authority (EPO), International Search Report for corresponding International Application No. PCT/US2008/086175, Apr. 17, 2009, European Patent Office.
(Continued)

*Primary Examiner* — Ronald Hartman, Jr.
(74) *Attorney, Agent, or Firm* — Steven W. Hudnut; Michael C. Prewitt

(57) ABSTRACT

A method and system restores power in a power distribution network. The network includes a plurality of power sources, a plurality of loading zones, a plurality of switching devices interconnected between the plurality of power sources and the plurality of loading zones, and an intelligent electronic device associated with each of the plurality of switching devices to control the switching devices. A base network state is defined and a power restoration logic is created for the base network state. A simulation is run for the power restoration logic and then the power restoration logic is transmitted to a power restoration controller which thereafter monitors and controls the intelligent electronic devices.

23 Claims, 17 Drawing Sheets

(51) Int. Cl.
  G05D 9/00    (2006.01)
  G05D 11/00   (2006.01)
  G05D 17/00   (2006.01)
  H02H 3/00    (2006.01)
  H02H 7/00    (2006.01)
  H02H 7/28    (2006.01)
  H02H 3/06    (2006.01)
  H02H 3/26    (2006.01)

(56) References Cited

U.S. PATENT DOCUMENTS

| | | | | |
|---|---|---|---|---|
| 5,696,695 | A * | 12/1997 | Ehlers et al. | 700/286 |
| 5,734,586 | A * | 3/1998 | Chiang et al. | 700/286 |
| 5,784,237 | A | 7/1998 | Velez | |
| 5,883,796 | A * | 3/1999 | Cheng et al. | 363/40 |
| 5,973,899 | A | 10/1999 | Williams | |
| 6,816,757 | B1 * | 11/2004 | De La Ree et al. | 700/286 |
| 6,907,321 | B2 | 6/2005 | Kearney | |
| 7,652,396 | B2 * | 1/2010 | Poroseva et al. | 307/147 |
| 7,705,487 | B2 * | 4/2010 | Chaiquin | 307/64 |
| 7,751,166 | B2 * | 7/2010 | Stoupis et al. | 361/64 |
| 8,010,336 | B2 | 8/2011 | Chaiquin | |
| 2004/0010350 | A1 * | 1/2004 | Lof et al. | 700/292 |
| 2004/0153215 | A1 * | 8/2004 | Kearney et al. | 700/293 |
| 2005/0165730 | A1 | 7/2005 | Akiyama | |
| 2006/0229768 | A1 * | 10/2006 | Chassin et al. | 700/295 |
| 2007/0005193 | A1 * | 1/2007 | Nelson et al. | 700/286 |
| 2008/0225452 | A1 * | 9/2008 | Stoupis et al. | 361/62 |
| 2009/0112375 | A1 * | 4/2009 | Popescu | 700/292 |

OTHER PUBLICATIONS

International Searching Authority (EPO), Written Opinion of the International Searching Authority for corresponding International Application No. PCT/US2008/086175, Jun. 12, 2010, European Patent Office.
Giovanni De Santis, Reply to Communication Pursuant to Rules 161(1) and 162 EPC and Pre-Examination Amendment in corresponding European Patent Application No. 08860183.6, Aug. 27, 2010.
The Patent Office of the People's Republic of China, Office Action for corresponding Chinese patent application No. 200880124627.0, Oct. 30, 2012.
N. G. Bretas, A.C.B. Delbem, and A. De Carvalho, "Optimal Energy Restoration for General Distribution Systems by Genetic Algorithms," Proceedings of International Conference on Power System Technology, vol. 1, 1998.
S. Toune, H. Fudo, T. Genji, Y. Fukuyama, and Y. Nakanishi, "Comparative Study of Modern Heuristic Algorithms to Service Restoration in Distribution Systems," IEEE Transactions on Power Delivery, vol. 17, 2002.
J. G. Rolim and C. R. Da Silva Filho, "An Intelligent Tool for Maintenance Scheduling of Distribution Systems," Proceeding of International Conference on Electric Utility Deregulation and Restructuring and Power Technologies, 2000.
G.Ockwell,"Implementation of Network Reconfiguration for Taiwan Power Company," IEEE PES General Meeting, 2003.
D.M.Staszesky, D.Craig, C.Befus,"Advanced Feeder Automation Is Here," IEEE Power & Energy Magazine, Sep./Oct. 2005.
J.Fan, X.Zhang,"Feeder Automation within the Scope of Substation Automation," Power System Conference and Exposition, Nov. 2006.
V.S.Devi, and G. Anandalingam,"Optimal Restoration of Power Supply in Large Distribution Systems in Developing Countries," IEEE Transactions on Power Delivery, vol. 10. No. 1, Jan. 1995.
J.S.Wu, K.L.Tomsovic, and C.S.Chen,"A Heuristic Search Approach to Feeder Switching Operations for Overload, Faults, Unbalanced Flow and Maintenance," IEEE Transactions on Power Delivery, vol. 6, No. 4, Oct. 1991.

T.Taylor and D. Lubkeman,"Implementation of Heuristic Search Strategies for Distribution Feeder Reconfiguration,," IEEE Transactions on Power Delivery, Jan. 1990.
Y.Moon, B.Cho, H.Park, H.Ryu, B.Ha and S.Lim, "Fault Restoration Algorithm Using Fast Tracing Technique based on the Tree-Structured Database for the Distribution Automation System," IEEE PES Summer meeting, 2000.
C.Liu,S.J.Lee and S.S.Venkata,"An Expert System Operation Aid for Restoration and Loss Reduction of Distribution Systems," IEEE Transactions on Power Systems, vol. 3 No. 2. May 1988.
C.Huang,"Multi-objective Service Restoration of Distribution Systems Using Fuzzy Cause-Effect Networks," IEEE Transactions on Power Systems, vol. 18 No. 2, May 2003.
Y.T.Hsiao and C.Y.Chien,"Enhancement of Restoration Service in Distribution Systems Using a Combination Fuzzy-GA Method," IEEE Transactions on Power Systems vol. 15, Nov. 2000.
Y.Ke,"Distribution Feeder Reconfiguration for Load Balancing and Service Restoration by Using G-Nets Inference Mechanism," IEEE Transactions on Power Delivery, vol. 19, No. 3, Jul. 2004.
J.Wu,"A Petri-Net Algorithm for Multiple Contingencies of Distribution System Operation," IEEE Transactions on Power Systems, vol. 13, No. 3, Aug. 1998.
Q.Zhou, D.Shirmohammadi, W.E.Liu,"Distribution Feeder Reconfiguration for Service Restoration and Load Balancing,"IEEE Transactions on Power Systems, vol. 12,No. 2, May 1997.
K.N.Miu, H.D.Chiang, B.Yuan, G.Darling,"Fast Service Restoration for Large-Scale Distribution Systems with Priority Customers and Constraints," IEEE Transactions on Power Systems, vol. 13, No. 3, Aug. 1998.
C.Chen, C.Lin, and H.Tsai,"A Rule-Based Expert System with Colored Petri Net Models for Distribution System Service Restoration," IEEE Transactions on Power Systems, vol. 17, No. 4, Nov. 2002.
Paul W.Cox,"Self-Healing Networks: Performance Improvement by Automated Switching Algorithm," CIRED Seminar 2008: SmartGrids for Distribution, paper No. 0006, Frankfurt, Jun. 23-24, 2008.
Steven Hudnut, Instructions and Claims for Response to Office Action issued Oct. 30, 2012 for corresponding Chinese patent application No. 200880124627.0, May 3, 2013.
King & Wood Mallesons, Response to Office Action issued Oct. 30, 2012 for corresponding Chinese patent application No. 200880124627.0, May 14, 2013.
The Patent Office of the People's Republic of China, Office Action for corresponding Chinese patent application No. 200880124627.0, Oct. 29, 2013.
Steven Hudnut, Instructions and Claims for Response to Office Action issued Oct. 29, 2013 for corresponding Chinese patent application No. 200880124627.0, Mar. 7, 2014.
King & Wood Mallesons, Response to Office Action issued Oct. 29, 2013 for corresponding Chinese patent application No. 200880124627.0, Mar. 13, 2014.
The Patent Office of the People's Republic of China, Third Office Action for corresponding Chinese patent application No. 200880124627.0, Jul. 24, 2014.
Steven Hudnut, Instructions and Claims for Response to Third Office Action issued Jul. 24, 2014 for corresponding Chinese patent application No. 200880124627.0, Oct. 16, 2014.
EPRI, "IntelliGrid," archived webpage for http://www.epri.com/IntelliGrid/, printed Oct. 19, 2014 from http://web.archive.org/web/20070708043627/http://www.epri.com/IntelliGrid/.
NovaTech, "Distribution Automation—Orion Application Document," Oct. 2010.
NovaTech, "New Distribution Automation Application Note," dated Apr. 10, 2007, printed Oct. 20, 2014 from http://www.novatechweb.com/news/novatech-news-distribution-automation-application-note/.
NovaTech, "Distribution Automation: Orion Application Note," 2007.
NovaTech, "Orion DA-Master: Distribution Automation Controller," 2009.

* cited by examiner

| Opened Switch | Divided sub-networks | Maximum substation capacity in each sub-network | Total unserved load amount in each sub-network | Can unserved loads be restored in each sub-network? |
|---|---|---|---|---|
| R4 | (1) S2, R5, L4 | 500 amp (S2) | 100 amp (load L4) | Yes |
| | (2) Rest of network | 700 amp (S4) | 850 amp (Sum of loads L2, L3, and L5-L9) | No |
| R6 | (1) S1, S2, R1-R5, R11, R12, L1-L4, L7 | 700 amp (S4) | 400 amp (Sum of loads L2, L3, L4, and L7) | Yes |
| | (2) Rest of network | 500 amp (S3) | 550 amp (Sum of loads L5, L6, L8, and L9) | No |
| R12 | (1) S4, R11, L7 | 700 amp (S4) | 100 amp (L7) | Yes |
| | (2) Rest of network | 500 amp (S2 or S3) | 850 amp (Sum of loads L2-L6, L8 and L9) | No |
| R13 | (1) S1, S2, R1-R6, R11, R12, L1-L4, L7, L9 | 700 amp (S4) | 650 amp (Sum of loads L2-L4, L7 and L9) | Yes |
| | (2) Rest of network | 500 amp (S3) | 300 amp (Sum of loads L5, L6, and L8) | Yes |

Fig. 14

| Switch to open | Separated sub-networks | Maximum substation capacity (A) in each sub-network | Total unserved load amount in each sub-network | Can unserved loads be restored in each sub-network? |
|---|---|---|---|---|
| R4 | (1) S2, R5, L4 | 500 amp (S2) | 100 amp (load L4) | Yes |
| | (2) Rest of the unserved network | 500 amp (S3) | 1100 amp (Sum of loads L2, L3-L8) | No |
| R6 | (1) S2, R3-R5, L2-L4 | 500 amp (S2) | 400 amp (Sum of loads L2-L4) | Yes |
| | (2) Rest of the unserved network | 500 amp (S3) | 800 amp (Sum of loads L5-L8) | No |
| R7 | (1) S2, R3-R6, L2-L5 | 500 amp (S2) | 650 amp (Sum of loads L2-L5) | No |
| | (2) Rest of the unserved network | 500 amp (S3) | 550 amp (Sum of loads L6-L8) | No |

Fig. 16

LOAD RESTORATION FOR FEEDER AUTOMATION IN ELECTRIC POWER DISTRIBUTION SYSTEMS

CROSS REFERENCE TO RELATED APPLICATIONS

This application is a 35 U.S.C. §371 national stage filing of International Application No. PCT/US2008/086175, filed Dec. 10, 2008, which claimed the benefit of and priority to U.S. Provisional Patent Application Ser. No. 61/012,969, filed Dec. 12, 2007. The complete disclosures of the above-identified patent applications are hereby incorporated by reference for all purposes.

FIELD OF INVENTION

This invention relates to the field of restoring electric power to a distribution system after circuit abnormalities.

BACKGROUND

An electric power distribution system generally consists of a set of distribution substations, feeders, switches (circuit breakers, reclosers, etc.) electrical loads, and monitoring and control devices. A distribution system delivers electric power energy (i.e., electricity) from distribution substations via feeders and switches to electrical loads (customers) that connect to feeders. Feeders in a distribution system are usually configured in a radial type to make sure that each load is supplied by only one distribution substation (source) via one feeder at any instant. To maintain the radial configuration, each feeder is linked by a normally open tie-switch to its neighboring feeders. The feeder section that is relatively near/far to its source is referred to as upstream/downstream section, while comparing to the feeder section that is relatively far/near to its source. A switch in the distribution system may be associated with an intelligent electronic device (IED) that have the following monitoring and control functions: (1) measuring and recording electrical and other types of switch related quantities, such as voltage, current, reclosing times (2) monitoring the switch status, (3) operating the switch between open or close, and (4) communicating information with master devices.

Distribution system reliability can be greatly improved through the use of feeder automation technology that implements automatic fault detection, isolation, and load restoration. In such systems, IEDs associated with switches monitor the distribution system and communicate the corresponding information to the feeder automation master controllers located in substations. If a fault occurs in the distribution system, the master controller identifies the fault location, generates fault isolation and service restoration solutions in terms of a sequence of switch operations, and sends switching commands to IEDs to control corresponding switches. Such prior art systems are often difficult to program/configure/engineer, slow to respond to changing network conditions, and hard to optimize the restoration solutions. Thus, there is a need in the art for improved feeder automation systems.

SUMMARY OF THE INVENTION

According to one embodiment, a method of restoring power in a power distribution network is disclosed. The power distribution network includes a plurality of power sources, a plurality of loading zones, a plurality of switching devices interconnected between the plurality of power sources and the plurality of loading zones, an intelligent electronic device associated with each of the plurality of switching devices to control the switching devices. The method includes providing at least one power restoration controller in communication with the intelligent electronic devices, defining at least one base network state, creating power restoration logic for the at least one base network state, simulating the power restoration logic for the at least one base network state, and transmitting the power restoration logic to the at least one power restoration controller which thereafter monitors and controls the intelligent electronic devices.

According to another embodiment of the present invention, a method of restoring power in a power distribution network is provided. The power distribution network includes a plurality of power sources, a plurality of loading zones, a plurality of switching devices interconnected between the plurality of power sources and the plurality of loading zones, an intelligent electronic device associated with each of the plurality of switching devices to control the switching devices, and a power restoration controller in communication with the intelligent electronic devices. The method includes isolating the loading zone that is in a faulted state, identifying one or more un-served load networks including loading zones downstream from the loading zone in a faulted state, restoring power to each un-served load network from a single power source, opening the switch or switches that separate each un-served load network into two or more sub-networks if no single power source is capable of restoring power to the un-served load network, and restoring power to each of the sub-networks from a single power source, until the source capacity is exhausted or switch loading capacity is violated.

DESCRIPTION OF THE DRAWINGS

FIG. 14 shows a table for determining whether un-served loads of FIG. 12 (when a fault is at load node L1) can be restored in each sub-network.

FIG. 16 shows a table for determining whether un-served loads of FIG. 15 (when a fault is at load node L1) can be restored in each sub-network.

DETAILED DESCRIPTION OF THE INVENTION

Figure 1:
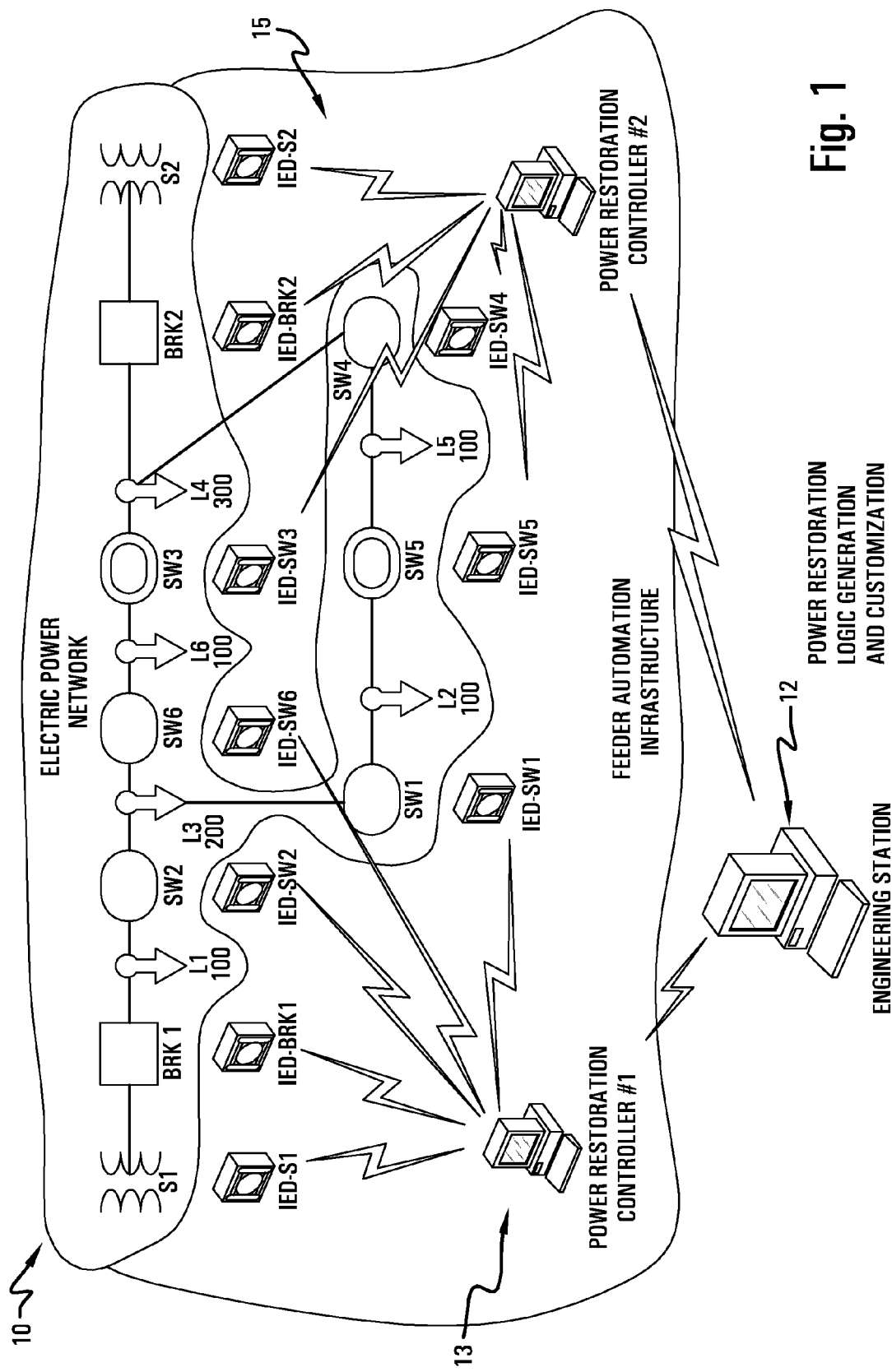
FIG. 1 is an exemplary power network according to the present invention.

Referring now to FIG. 1, an electric power network is shown and generally indicated by the numeral 10. Generally, the feeder automation infrastructure 11 is the control mechanism, and the engineering station 12 is the location where the control logic is generated, customized, and transferred over to the power restoration controllers 13.

Briefly, electric power restoration involves the interplay between a plurality of power sources (S1/S2), plural switching devices (Brk1/Brk2 are circuit breakers, SW1/SW2/SW4//SW6 are either reclosers or sectionalizers, SW3/SW5 are tie switches), and a plurality of loading zones (L1/L2/L3/L4/L5/L6). An exemplary scenario, may be the occurrence of a permanent fault at L1, wherein Brk1 locks out after a pre-defined number of reclosing attempts. First, the system must isolate the faulty load zone L1 and second, attempt to restore the power to the load zones (L2, L3 and L6) that are unserved due to the lockout and isolation. The objective is to minimize the number of switch operations and/or achieve the optimally balanced loading between alternative restoration sources (if two or more).

Feeder automation infrastructure 11 includes the IEDs 14, the power restoration controllers 13, and communication links 15 between IEDs 14 and controllers 13. Multiple controllers 13 may be required because each has finite processing power, and each has direct communication links to a finite number of IEDs 14. Controllers 13 may coordinate with each other to form a super controller. Further description of configurations are provided in co-owned U.S. application Ser. No. 11/687,213, which is hereby incorporated by reference in its entirety. According to one embodiment, the methods and system according to the present invention develops the control logic for the super controller.

The system and software that embody the present invention may advantageously reside at an off-line engineering station 12. After the control logic and their associated settings are engineered, they may be transmitted to power restoration controllers 13 for real-time control operations.

Figure 2:
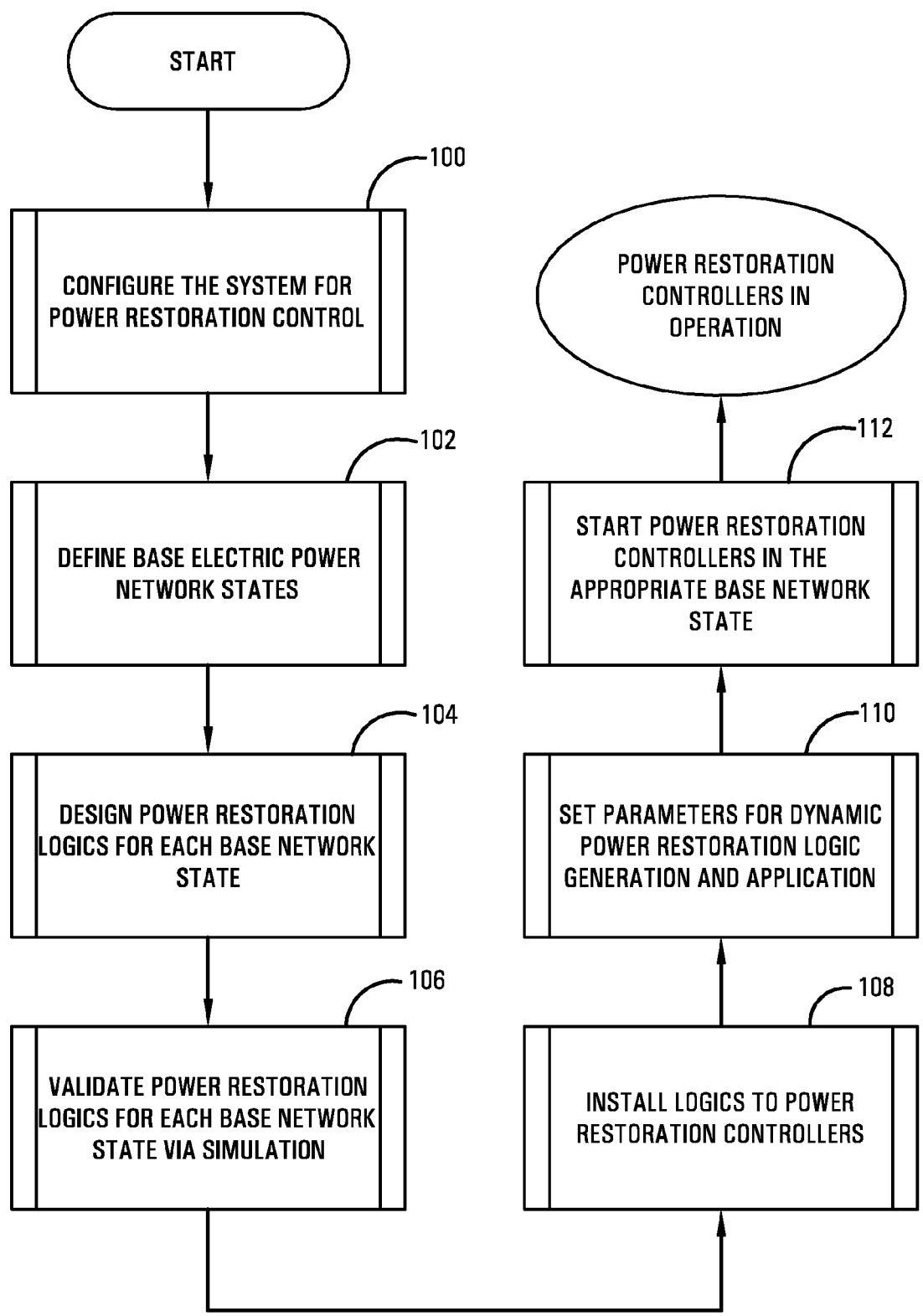
FIG. 2 is a flowchart showing the restoration logic generation creation, validation, installation and execution process, according to the present invention
Figure 3:
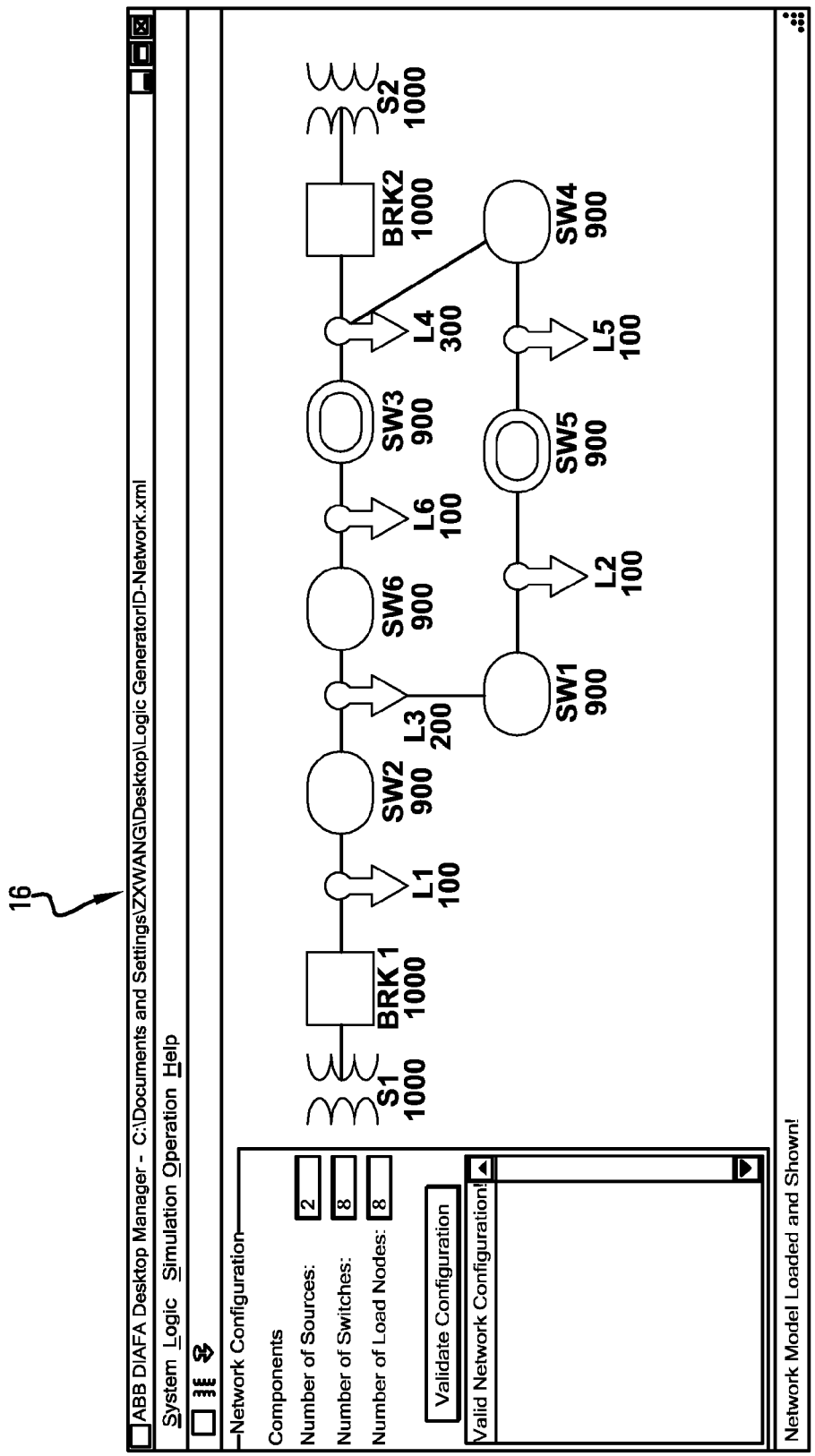
FIG. 3 is a screen shot of the network configuration tool according to the present invention.

The logic engineering and application process will now be described with reference to FIG. 2. In a first step 100, the electric power system (network) is configured. This includes modeling the electric power network 10 (control object), as well as the feeder automation infrastructure 11 (IEDs and the controllers). This is done via the network configuration tool 16 shown in FIG. 3, where the electric power network components and their connectivity are shown.

The electric power network model is an electrically correct topological model, and not a geographically faithful representation of the physical network. The electrical topology is used to reduce the configuration efforts by users. However, the basic electrical parameters of the system components are used by the present invention. Parameters may include loading capacity of sources (S1 and S2), switches (SW1-SW6) and the feeder segments, maximum loading of load zones (L1-L6), and the impedances of the feeder segments. This information allows the system to perform loading capacity checks and other restoration validation checks during logic generation.

The current network configuration may be validated at any time to prevent configuration errors. The results may be shown to the user so that action may be taken to resolve the issues. Network configuration validation may check for un-served loads, non-radial feeding and loading capacity violations.

Concurrently, IEDs 14 are configured and attached to the sources (S1, S2) and switching devices (SW1-SW6) in the electric power network 10. The IEDs 14 provide inputs to the controllers 13 and execute control actions through the switches (SW1-SW6). Each IED 14 is assigned to a controller 13, and thus is configured to be in direct communication with that respective controller 13. The communication may be through wireless or wired means. The controller 13 may poll or listen to associated IEDs 14 for data updates through a communication mechanism.

In a next step 102, the base electric network states are defined. A network state is a particular network topology, or tie breaker location, coupled with loading capacity of sources. The reason for this definition is that asset management objectives, such as load balancing of transformers, can be achieved by switching the network to different states, depending on the season and/or loading conditions of the power network.

Figure 4:
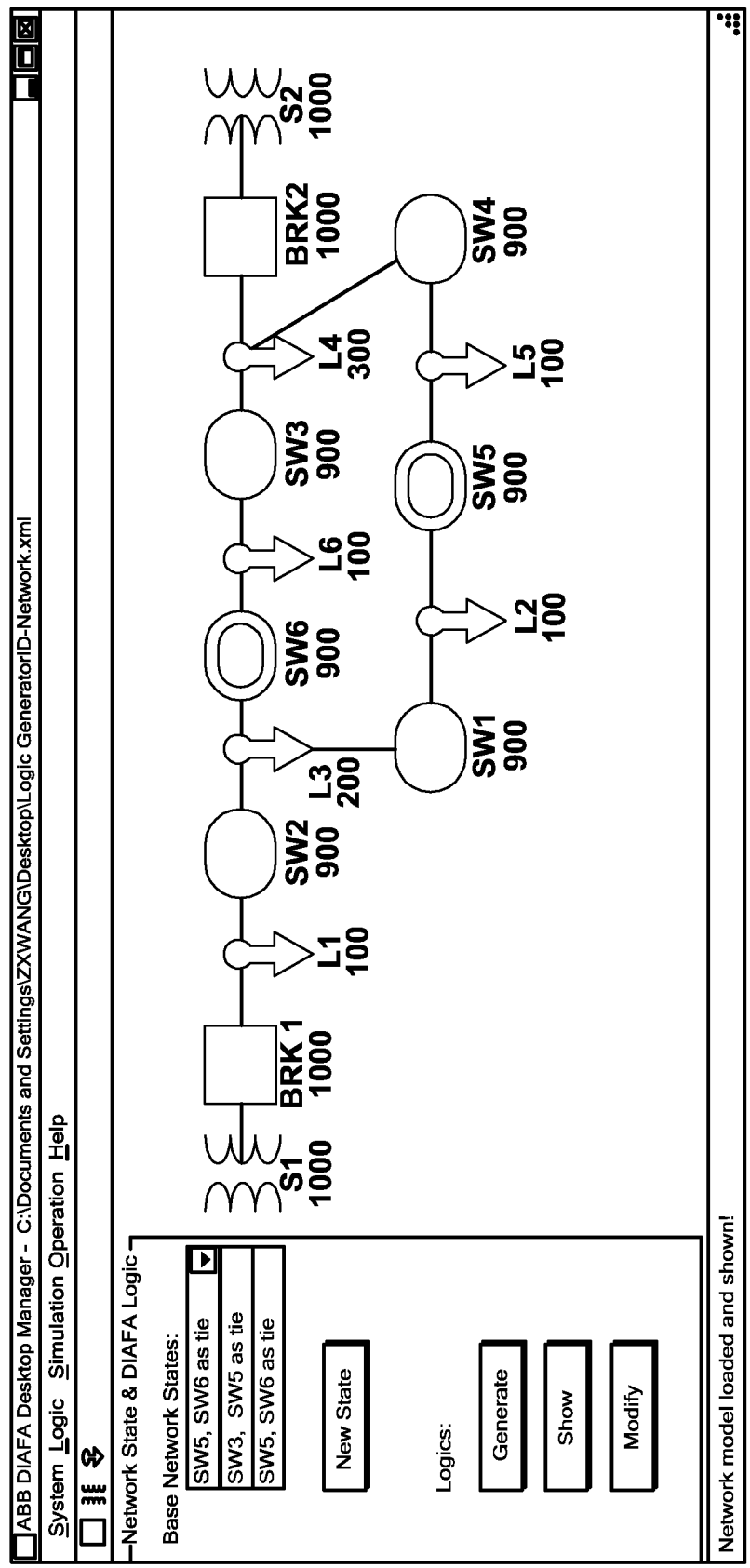
FIG. 4 is a screen shot of the network state and restoration logic definition tool according to the present invention.

If, for example, load zone L2 and L6 are mainly air conditioning loads, and can vary between 100A and 300A in summer, the loadings of S1 and S2 are unbalanced. The utility is better off using SW5 and SW6 as tie switches in this summer time-frame (to keep comfortable reserving capacity at both S1 and S2, and to avoid excessive wearing of insulation at source transformer S1). The current tie switch assignment (SW3 and SW5) may then be used in winter time. Thus, the user may define unique network states, one ("SW6,SW5 as tie") for summer and another ("SW3,SW5 as tie") for winter. This may be done via the network state and restoration logic definition tool 17 shown in FIG. 4. The network shown is the base network state "SW5,SW6 as tie" (the network shown in FIG. 1 corresponds to base network state "SW3,SW5 as tie"). When a new base network state is defined, the network validation principles discussed above may be applied to each defined base network state.

In a next step 104, the power restoration logic for each base network state is designed. The power restoration logic design according to step 104 is for a single permanent fault in a particular base network state. The objective of power restoration logic is to isolate a single permanent fault and restore power to non-faulted load zones. The design of the logic involves two steps. First, for a given base network state, power restoration logic is generated automatically, for a simulated permanent fault at each load zone. Next, the user views and modifies the logic as needed.

Automated logic generation not only avoids mistakes often made in manual logic generation process, it also greatly improves the speed of logic design. Capacity checks and other network validation checks may also be conducted to make sure the network state, after power restoration, functions properly.

According to one embodiment, the textual representation of logic is:

```
IF
    LockoutOnFaultRecloser is locked out on fault at load zone
FaultLoad                                          (mandatory)
    AND LockoutSwitches are locked out (mandatory for restoration)
    AND OpenSwitches are open            (optional)
    AND CloseSwitches are closed         (optional)
```

```
    FOR TimeDelay seconds
THEN
    Open/Close/Lockout OprSwitch
```

Where

LockoutOnFaultRecloser represents a recloser or a circuit breaker with reclosing functionality that locked out upon sensing a downstream fault condition and running through the reclosing sequence of operations.

LockoutSwitches represents one or more switches (sectionalizers) that locked out after the fault isolation switching operations (to ensure the safety of repair crews).

OpenSwitches and CloseSwitches represent one or more switches (reclosers, sectionalizer, and/or tie switches) that are open or closed, respectively. These are optional conditions to ensure the interim network states (between pre-fault and post-restoration) are changed in a sequence of switch operations. Preferably, all switches other than the LockoutOnFaultRecloser and LockoutSwitches should be included in either the OpenSwitches or the CloseSwitches. However, the user can choose to delete any of these switches if he/she is sure the deletion will not affect the integrity of the power restoration logic operation sequence.

TimeDelay represents a user added time delay before any switch operation is executed after all the switch position conditions are met. This ensures sufficient time for switching operations to complete and for fail out management if any switch fails to operate, or there are lost communications or other exceptions in the restoration process.

OprSwitch is the switch to operate (open/close/lockout) when the switch position conditions are met and the TimeDelay has elapsed.

The logic representation above integrates both the fault isolation logic and the power restoration logic, as well as the preference of users.

Referring again to FIG. 4, assume Brk1 and Brk2 are breakers with reclosing functionality, and all the other switches are sectionalizers or tie switches. When load zone L1 is under a single permanent fault, the isolation logic is FaultL1Iso:

```
IF
    Brk1 is locked out on fault at fault in load zone L1
    AND SW2 is closed
    For 2 seconds
THEN
    Lockout SW2
```

And the simplified restoration logic (no optional conditions of open/close switches) is FaultL1Res1:

```
IF
    Brk1 is locked out on fault at fault in load zone L1
    AND SW2 is locked out
    For 2 seconds
THEN
    Close SW6
```

Or FaultL1Res2:

```
IF
    Brk1 is locked out on fault at fault in load zone L1
    AND SW2 is locked out
    For 2 seconds
THEN
    Close SW5
```

Figure 5:
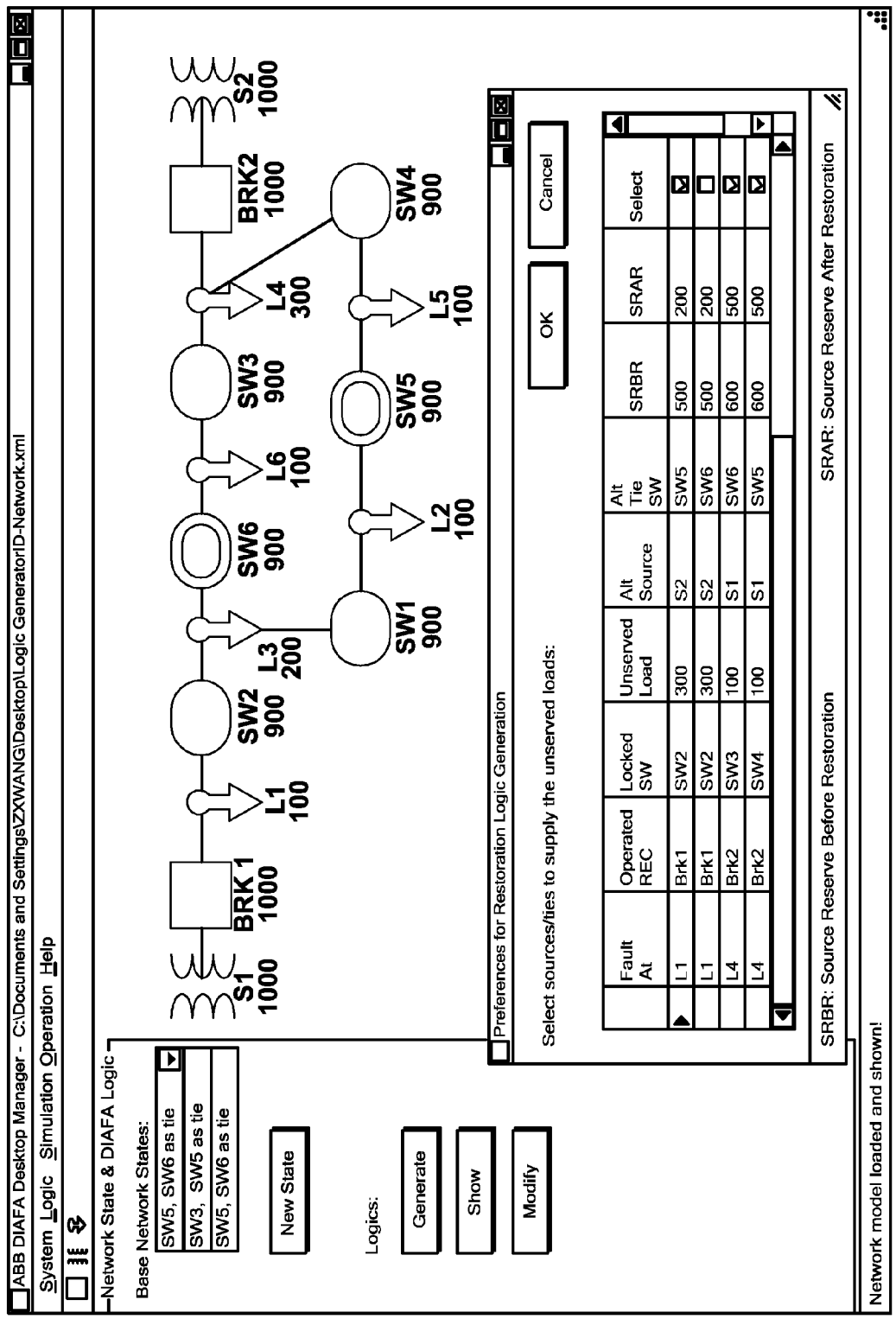
FIG. 5 is a screen shot of the network state and restoration logic definition tool displaying to the user the potential restoration network paths for selection.

As shown in FIG. 5, the use of SW6 or SW5 for the power restoration is left to the user to decide when the logic is generated for the base network state. Two power restoration paths are provided, one from "Alt Tie SW" (alternative tie switch) SW5 and the other from "Alt Tie SW" SW6. The user must select the preferred path to restore the power, or optionally, a default path may be automatically selected.

Also shown in FIG. 5 are the restoration logic preferences for a fault at location L4. In this case, two switches (SW3/SW4) must be locked out for fault isolation. As a result, tie switches (SW5/SW6) must close to restore the power to load zone L5 and L6 respectively. Though both should be selected to restore power to both L5 and L6, a user may uncheck one or both of the two paths to prevent power restoration to a particular load zone.

When the fault is in a load zone adjacent to a tie switch, the isolation logic to lockout that tie switch is unnecessary, but all other switches connected to the faulted load zone must be locked out for fault isolation. For example, when a fault is in load zone L3 (see FIG. 4), the isolation logic includes: FaultL3Iso1:

```
IF
    Brk1 is locked out on fault at fault in load zone L3
    AND SW2 is closed
    For 2 seconds
THEN
    Lockout SW2
```

And FaultL3Iso2:

```
IF
    Brk1 is locked out on fault at fault in load zone L3
    AND SW1 is closed
    For 2 seconds
THEN
    Lockout SW1
```

And the simplified restoration logic (no optional conditions of open/close switches) is FaultL3Res1:

```
IF
    Brk1 is locked out on fault at fault in load zone L3
    AND SW1 is locked out
    For 2 seconds
THEN
    Close SW5
```

And FaultL3Res2:

```
IF
    Brk1 is locked out on fault at fault in load zone L3
    AND SW1 is locked out
    AND SW2 is locked out
    AND SW6 is open
    For 2 seconds
```

-continued

```
        THEN
            Close Brk1
```

In some instances, none of the source paths can restore the power to the unserved load zones after fault isolation. This problem is a typical multi-source, multi-load zone power distribution planning problem. Many different optimization algorithms may be applied to find the optimal solution. According to one embodiment, the present invention may employ a look-ahead tracing algorithm according to the following steps:

(1) Create a study network with the un-served load zones after fault isolation (excluding the faulty load zone) and the tie switches as sources (capacity of the sources is taken as the lesser of, the remaining capacity available from the tie switch and the loading capability of the tie switch).

(2) Open all the switches in the network.

(3) Starting from each source and moving downstream, close one switch at a time, and compute the remaining available capacity by subtracting the load of the downstream load zone from the its current loading capacity. If the net result is negative, mark the switch as intended tie switch and stop, otherwise continue until a tie switch can be declared or a multi-source supplied load zone is reached.

(4) When all processes of (3) are stopped, check if a multi-source supplied load zone has been reached by more than one process. If so, mark the process with the maximum remaining capacity as the winning process, and mark all the switches connecting to this multi-source load zone and of the other processes as intended tie switches.

(5) Repeat (3) and (4) until all switches in the study network are exhausted.

In still other embodiments, the present invention may employ multi-path restoration logic discussed in greater detail below.

Figure 6:
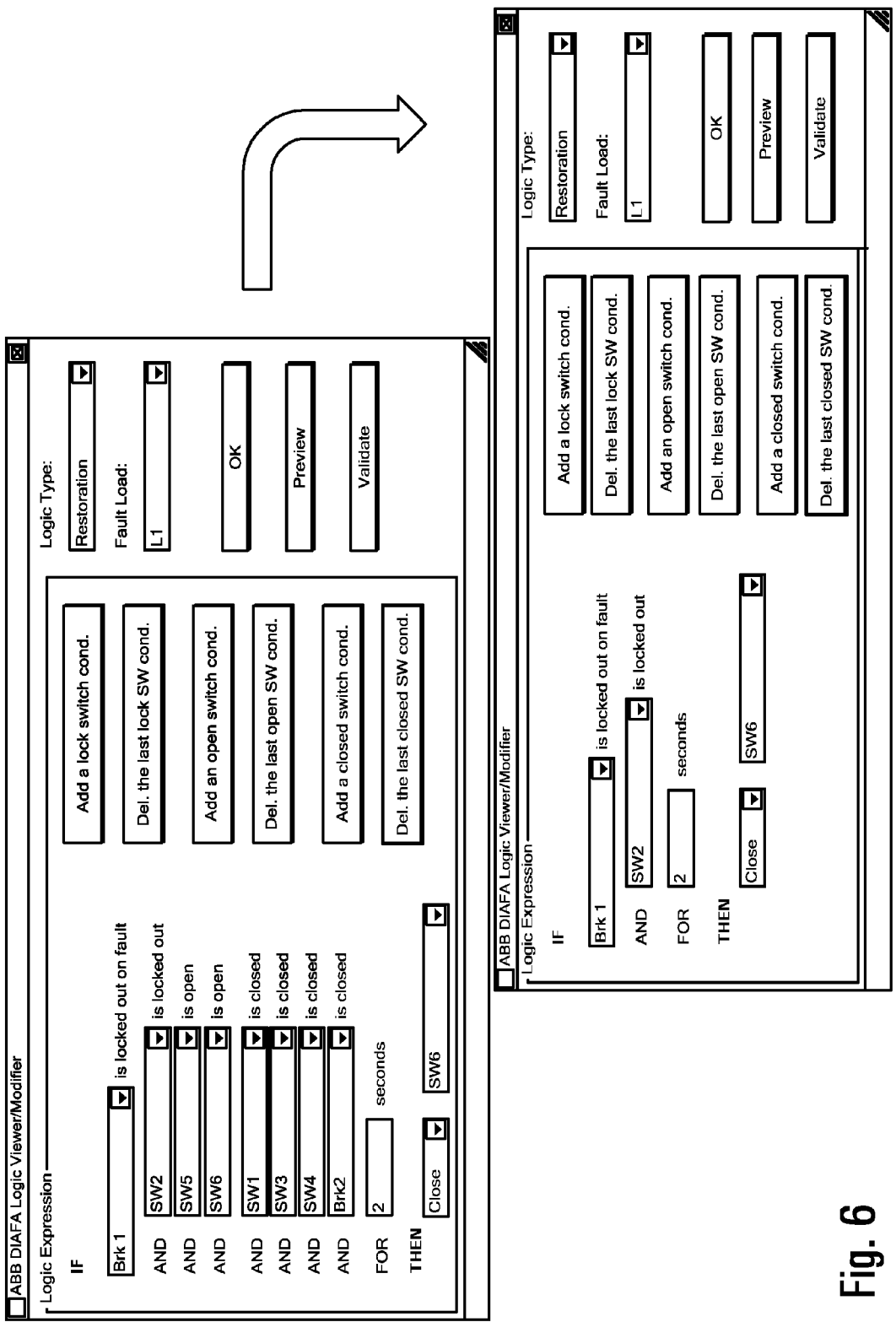
FIG. 6 is a screen shot of a window for modifying and viewing the restoration logic.

Referring now to FIG. 6, after the logic is generated, it may be viewed and modified, for example, to simplify the restoration logics. The user can also add/remove logics. For example, he/she can replace logic Fault1Res1 with the following three logics to restore power from both available paths instead of one.

FaultL1UserRes1:

```
    IF
        Brk1 is locked out on fault at fault in load zone L1
        AND SW2 is locked out
        For 2 seconds
    THEN
        Open SW1
```

FaultL1UserRes2:

```
    IF
        Brk1 is locked out on fault at fault in load zone L1
        AND SW2 is locked out
        AND SW1 is open
        For 2 seconds
    THEN
        Close SW6
```

And FaultL1UserRes3:

```
    IF
        Brk1 is locked out on fault at fault in load zone L1
        AND SW2 is locked out
        AND SW1 is open
        For 2 seconds
    THEN
        Close SW5
```

By this means, the user may customize the logic to have any preferences taken into account. The effect of these changes may be viewed and validated visually through simulation.

Figure 7:
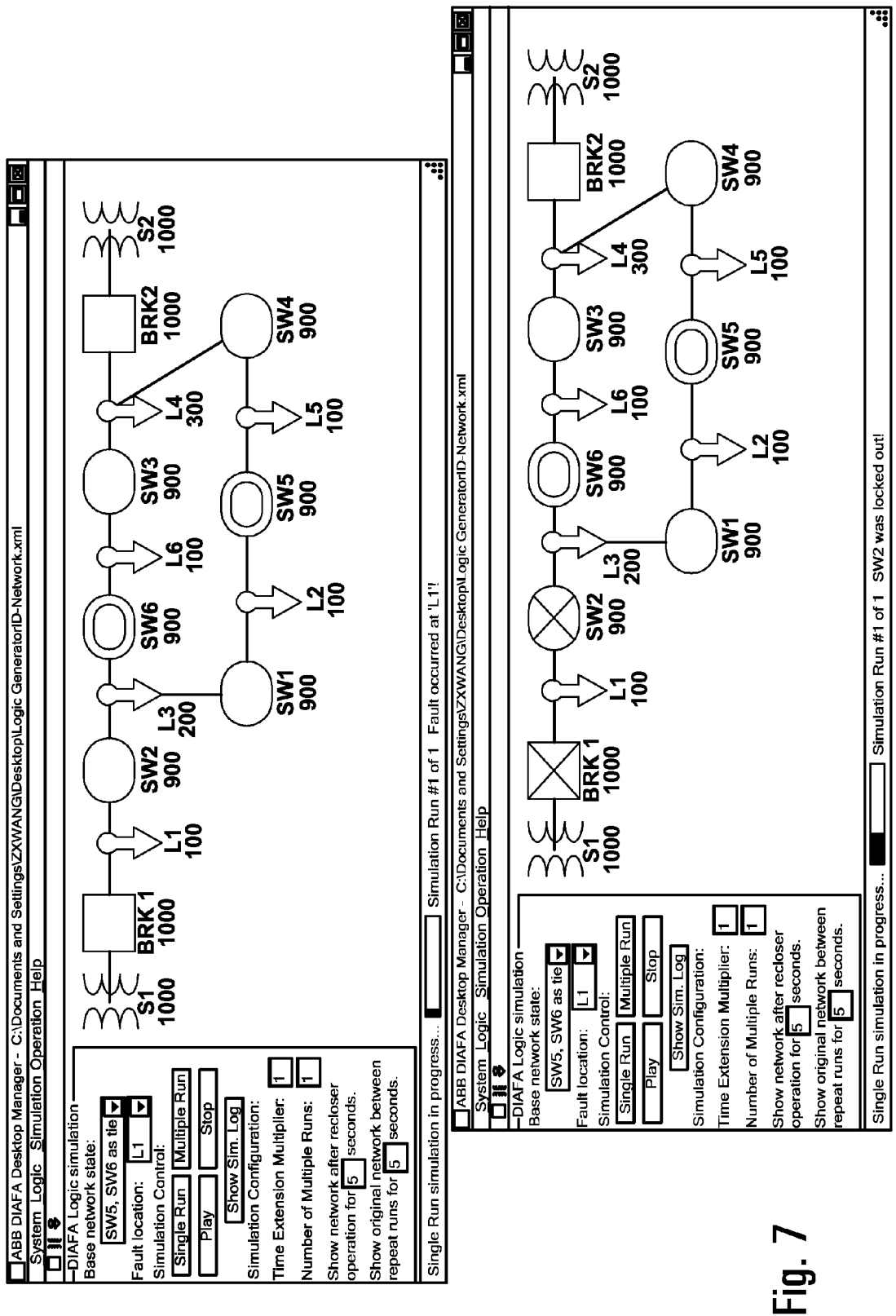
FIG. 7 is a screen shot of the simulation tool for the pre-defined logics according to the present invention.
Figure 8:
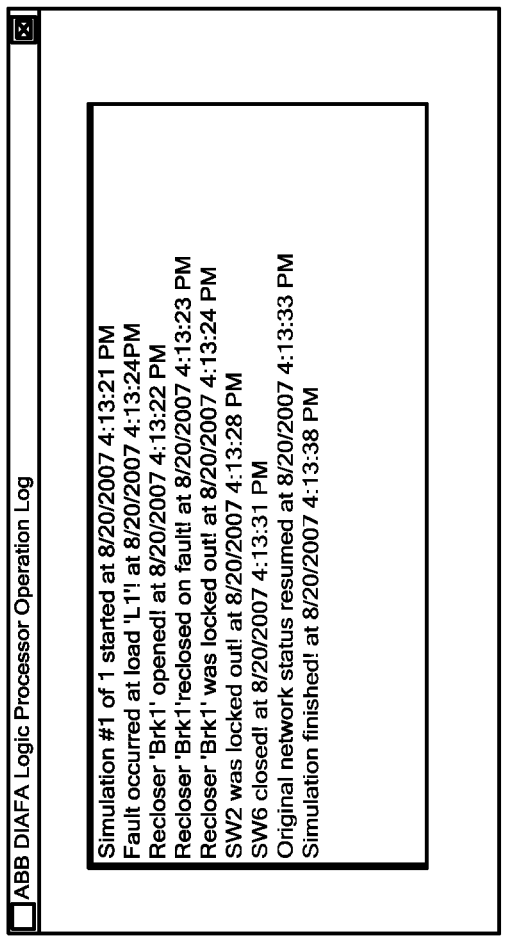
FIG. 8 is a screen shot of the logic processor operation log according to the present invention.

In a next step 106, the logic is validated for each base network state via simulation. For logic validation, visual simulation is an effective method. As shown in FIG. 7, the present invention provides a simulation tool that conducts "Single Run" and "Multiple Runs" of the logic operation. When the simulation is in progress, the user may pause and continue with the simulation, or stop the simulation. As shown in FIG. 8, the major events such as the fault introduced time, recloser lockout time, and isolation/restoration switch operation time may be logged for examination after the simulation.

In a next step 108, the network model, base network states and their associated power restoration logics are saved to a configuration file, and copied to the controllers 13, or passed to the controllers 13 via remote method calls.

In a next step 110, the parameters for the dynamic power restoration logic generation are set. In a next step 112, the power restoration controllers 13 are started in the appropriate base network state. The operator may manually switch the network to selected base network state, or may set the controllers 13 to identify the network states on their own. When the controllers 13 start, they open and parse the configuration files, setup the network model and the logic, and begin polling or listening to the IEDs. When the current network state matches one of the predefined base network states, the power restoration logic may be loaded automatically into the logic processor of the controller 13. The logic processor thereafter monitors if any fault occurs in one of the predefined load zones, and executes the subsequent fault isolation and power restoration procedures defined by the logic for that particular load zone.

The power restoration control operations are secondary to the protection and control functionality of the IEDs 14. In other words, the power restoration controllers do not take action until after a recloser has tripped, reclosed and locked out upon a fault. The controllers 13 identify a permanent fault only when a recloser has exhausted its predefined number of reclosing operations and locked out. The controllers 13 identify the fault location (load zone) by checking the event registers of the IEDs 14 attached to the switches. The latter requires the time synchronization of the IEDs 14, which is realized by sending time synchronizing commands from the controllers 13 to the IEDs. Also, the radial feeder network must be traced from the source to the downstream load zones to locate the faulty load zone.

The power restoration logic for a subsequent fault or a network state other than one of the base network states are generated by the dynamic power restoration logic generation engine, as will be hereinafter described in greater detail. It should also be appreciated that an operator may change the base network state, based on the loading conditions. The power restoration logic for the new base network state would thereafter be automatically loaded into the controllers.

Dynamic power restoration logic may be needed when the network is not in an identified base network state or if a second permanent fault occurs. The dynamic power restoration logic includes the logic generated "on-the-fly." In other words, the dynamic power restoration logic is generated while the power restoration controllers 13 are in operation. The logic generation process and format are similar to that of the single fault, and the primary difference lies in the way the user preferences are considered.

For dynamic power restoration logic generation, the user defines a preference factor PF and a preference table PT, where $0 \leq PF \leq 1$, and PT includes the following columns:
(1) BaseNetworkState—contains the name or index of a base network state;
(2) FaultyFeeder—contains the name or index of the feeder where the permanent fault occurs;
(3) AltPath—contains the name or index of an alternative power restoration path (tie switch);
(4) AltPathPriority—contains the priority settings (a value between 0 and 1) of an alternative power restoration path.

During the dynamic restoration logic generation process, if M number of alternative power restoration paths exist, the following priorities are computed:

$$\text{AltPriority}(i) = \text{AltPathPriority}(i) * PF + \text{AvailCapacityFactor}(i) * (1 - PF) \quad 1 \leq i \leq M \quad \text{(Eq.1)}$$

Where i is the index of the possible alternative power restoration path, AvailCapacityFactor(i) is the post-restoration available capacity reservation factor of the corresponding alternative power restoration path.

$$\text{AvailCapacityFactor}(i) = (\text{Capacity} - \text{TotalLoad})/\text{Capacity} \quad \text{(Eq.2)}$$

Where Capacity is the source capacity of the alternative power restoration path i, and TotalLoad is the total load of this source after the restoration. Thus, the alternative power restoration source with the maximum AltPriority will be used to build the power restoration logic.

If PF=1, the priority computation of (Eq.1) only considers the user preferences and the dynamic logic generation does the same. If PF=0, the priority computation of (Eq.1) only considers the load balancing of sources.

Generation of the restoration logic is based upon a connectivity matrix, also known as incidence or topology matrix. When a user builds a network 10 using the configuration tool discussed above, the matrix is automatically generated. With reference again to FIG. 5, the exemplary connectivity matrix for this system is shown.

|      | L1 | L2 | L3 | L4 | L5 | L6 | S1 | S2 |     |
|------|----|----|----|----|----|----|----|----|-----|
| Brk1 | -1 |    |    |    |    |    | +1 |    | (1) |
| SW2  | +1 | -1 |    |    |    |    |    |    |     |
| SW6  |    | +1 |    |    | -1 |    |    |    |     |
| SW3  |    |    | +1 |    |    | -1 |    |    |     |
| Brk2 |    |    |    | -1 |    |    |    | +1 |     |
| SW1  |    | -1 | +1 |    |    |    |    |    |     |
| SW5  |    | +1 |    |    |    | -1 |    |    |     |
| SW4  |    |    |    | +1 | -1 |    |    |    |     |

The rows and columns of this matrix correspond to the switches and buses (loads and sources) respectively. The rows and columns are labeled with the corresponding switch and bus names for clarity. Columns of this matrix are arranged such that the columns corresponding to load buses are first, followed by those corresponding to source buses. To observe this, the matrix above is partitioned into two column groups. The first group corresponds to load buses and the second group corresponds source buses.

The upstream and downstream bus information for each switch is also stored in this matrix. The elements on any row are either +1 or −1. The element +1 denotes the upstream bus position and −1 denotes the downstream bus position. For example, the first row (switch Brk1) includes a −1 element in the L1 column and a +1 in the S1 column. Thus, bus S1 is an upstream bus of Brk1 while L1 is the downstream bus. Regarding the normally open (NO) tie switches, the upstream and downstream bus cannot be defined, thus +1 and −1 elements are arbitrarily placed at the columns corresponding to the terminal buses of an NO tie switch. See, for example, the rows corresponding to switches SW5 and SW6.

Apart from the connectivity matrix, the logic generation procedure requires the status information of all the switches in the network (ie. whether a switch is open or closed). This information is stored in a vector having 0's (open switches) and 1's (closed switches). For the system under consideration (shown in FIG. 5), this vector includes 8 elements, with the $3^{rd}$ and $7^{th}$ elements corresponding to SW6 and SW5. The $3^{rd}$ and $7^{th}$ elements are set as 0 and all other elements as 1.

The connectivity matrix and the switch status vector are used in the logic generation algorithm to isolate a permanent fault and locate tie switches to provide backfeed to unserved loads.

The fault isolation logic generation algorithm identifies the fault isolating switch as the one that is immediately downstream of the fault. If there are multiple such switches, the algorithm identifies them all. This identification is done by tracing the connectivity matrix. For example, if a permanent fault occurs at L4, the recloser switch Brk2 locks out after its reclosing sequence. Now the algorithm goes through the following steps to identify the fault isolating switches.
1. Identify the row corresponding to the locked-out switch (that is, the "Brk2" row).
2. Find the location of −1 on this row (the "L4" column).
3. Find the all row locations of +1 in the same column (the "SW3" and "SW4" rows).
4. Set the switch corresponding to each +1 row to be open and locked-out to isolate the fault. These rows correspond to the immediately adjacent downstream switches.

With reference to the contingency table shown in FIG. 5, it can be seen that when the fault is at L4, switches SW3 and SW4 are identified as "Locked SW", which stands for locked out switches after fault isolation.

As another example, if a permanent fault occurs at L3, SW2 clears the fault (fault clearing switch) and switches SW6 and SW1 are identified as fault isolating switches. However given that SW6 is a NO tie switch, the algorithm will regard only SW1 as a fault isolating switch.

Once the fault is cleared and the correct fault isolation switch(es) is identified, options must be sought for back-feed so that power to un-served loads is restored. Referring again to FIG. 5, for a fault at L4, for instance, the un-served load due to the opening of SW3 is L6 (100 MW). Similarly, the un-served load due to the opening of SW4 is L5 (100 MW). This information is displayed to the user in the logic generation table in the column labeled "Unserved Load". The identification process for the appropriate backfeed to restore such unserved loads starts with first identifying the NO tie switches that can be closed to provide that backfeed from an alternate source. Note that for the present example, the alternate source is S1 (displayed in column "Alt Source"—where "Alt" means "Alternative").

Figure 9:
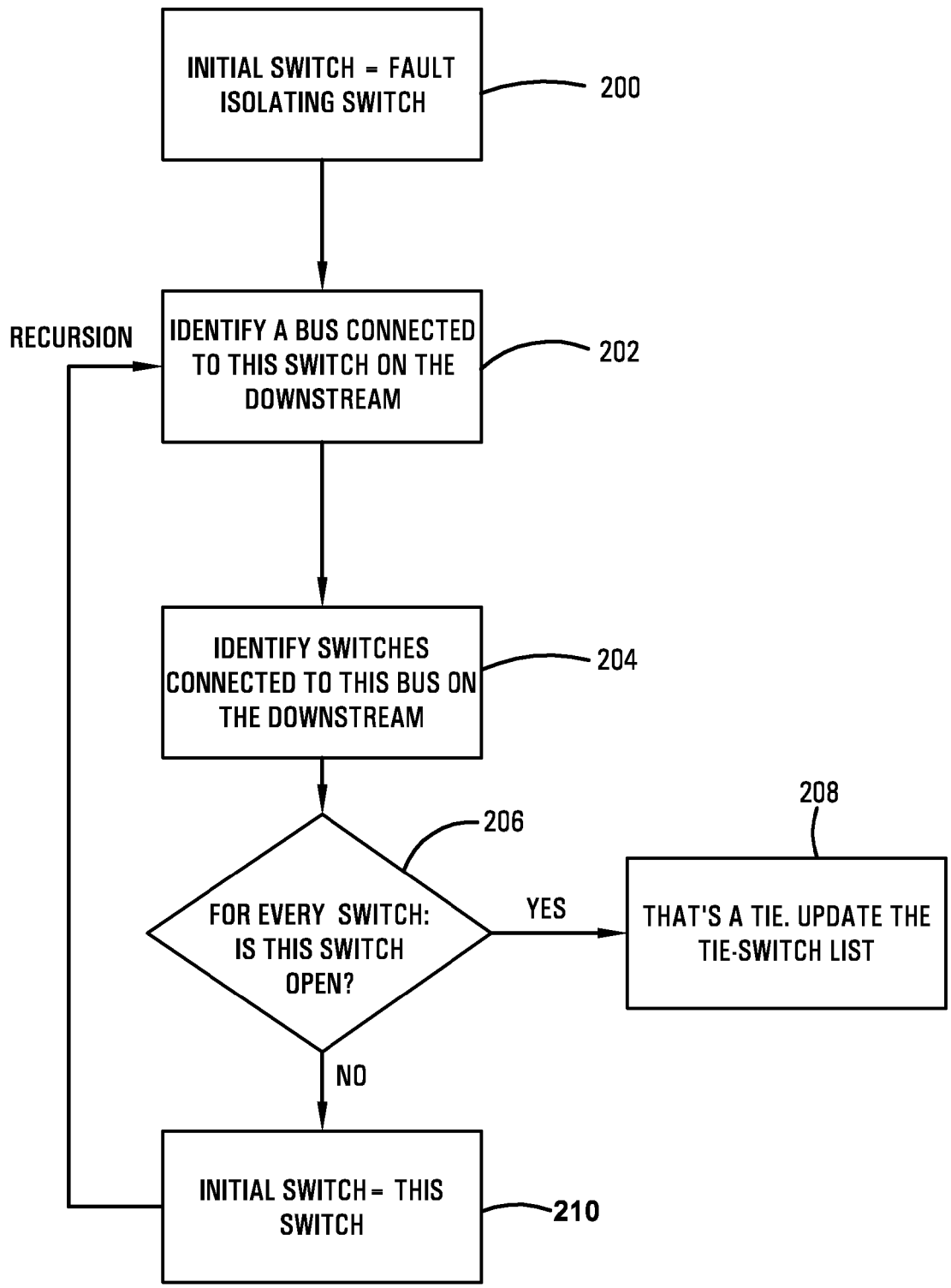
FIG. 9 shows the logic generation algorithm according to the present invention that identifies normally open tie-switches.

Referring now to FIG. 9, the logic generation algorithm employs a recursive method to identify relevant NO tie switches. In a first step 200, the initial switch variable is set to the fault isolating switch. At step 202, the downstream bus connected to the initial switch is identified. Next at 204, the downstream switch connected to the initial switch (identified at 202) is identified. At step 206, determine whether the switch identified at 204 is open. If yes, at 208 update the tie-switch list indicating that the switch identified at 204 is a tie-switch. If no, at 210 set the initial switch to the switch identified at 204 and revert to step 202.

A capacity check may be performed next to check whether the alternative source has sufficient capacity to serve the un-served load. In the example where a fault occurs at L4 and SW3/SW4 lock-out to isolate the fault, the above tie-switch identification method would identify switches SW5 and SW6. The capacity check for this example (fault at L4) includes a recursive process that computes the switch currents after the identified tie switch is closed (one at a time) to test if the switches have sufficient loading capacity to carry the computed switch currents. Similarly this process also computes the total current that would be supplied by the alternative source (S1) after backfeed to test if the source has sufficient capacity to supply that current. If a candidate backfeed survives the capacity check, it is considered as successful and displayed in the table in FIG. 5 for the user to see and select for actual restoration logic construction. The table also displays source reserve before restoration (SRBR) for S1, which is capacity of S1 (1000) minus the total load that it serves (100+200+100), which comes to 600. For the fault isolating switch SW3, the source reserve after restoration (SRAR) column displays 500 due to an extra 100 MW served by S1 on L6. A similar is true for the row corresponding to the fault isolating switch SW4.

When a tie switch, its corresponding source, and the network connections between them pass the capacity check, the restoration logic construction process engages. In this process, the safe guard measures for the restoration, for example the requirement that the isolation switch be opened first before the restoration tie switch is closed, is considered. As one of the conditions of the close logic of the tie-switch, the open status of the isolation switch must be satisfied. These safe guard measures can also be viewed as the sequence of the switch operations.

The above logic generation process applies to both offline custom logic generation (104 in FIG. 2) and online dynamic logic generation. The offline custom logic generation is for a given (predefined) network state, called the base network state. In this process, an individual fault is assumed at each load bus, and for each case the logic generation identifies a set of fault isolation switches and feasible back-feed scenarios (that successfully pass the capacity check). A table is shown (FIG. 5) that provides options to the user to select a back-feed path if multiple feasible back-feed paths exist for a given isolation switch. This encourages user interaction and takes into account user expertise and preferences. The user can define multiple base network states and generate restoration logics for each.

It is not desirable or feasible, however, for a user to consider all possible base network states and generate logic for each. Even for moderately complex distribution networks, the offline computation of logic requires consideration of large numbers of base network states. Moreover, if a network state changes for any reason to a different state (ex. execution of back-feed logic following a permanent fault), the logic generation engine must reinitialize to adapt to the changes.

To prepare the logic to cope with a new network state (possibly the one not considered in the offline custom logic generation process) at runtime, the dynamic power restoration logic generation is designed and implemented. The dynamic logic is generated "on-the-fly" when a fault occurs in the network. The logic generation process and format are structurally similar to that of the offline custom logic generation process. The difference lies in that the logic is generated for a specific identified fault that already occurred in the network, rather than considering all possible fault locations. The user preferences such as priority settings of an alternative restoration path and load balancing of alternative sources are considered dynamically using the parameters that the user sets offline. The dynamic process is particularly useful to handle multiple sequential faults, where a fault occurs in the system and it is isolated and all or part of the unserved loads are restored, and then another fault occurs in the network. The dynamic logic generation algorithm will automatically generate the required logics for this second fault, and any new faults.

Figure 10:
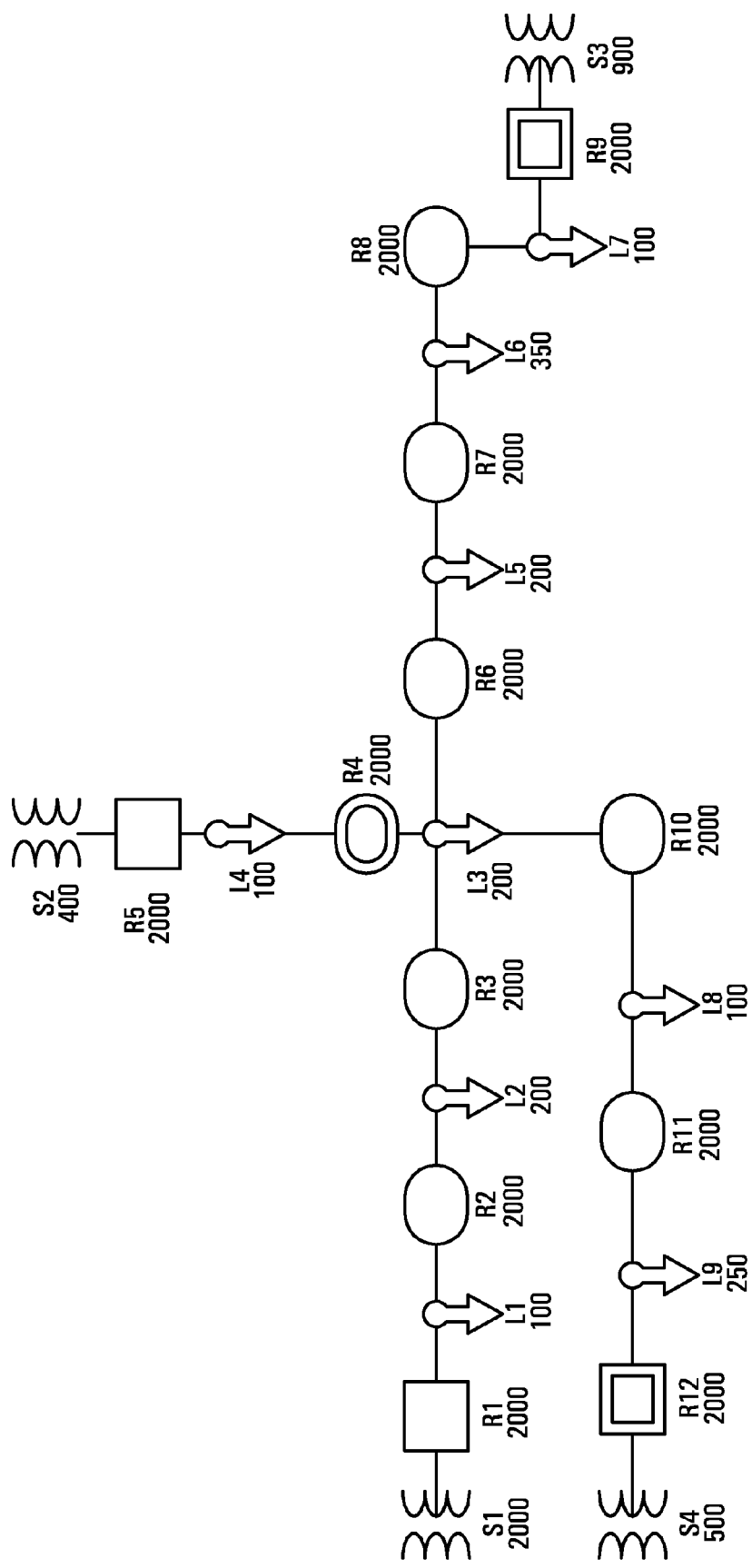
FIG. 10 is a second exemplary power network according to the present invention.

Referring now to FIG. 10, a second exemplary distribution system is shown. This system includes four substations (S1~S4), twelve switches (R1~R12, for illustrative purposes, all switches are assumed to have fault current breaking capability), nine loads (L1~L9), all of which are connected through feeder circuits. Switches R4, R9, and R12 are normally open tie-switches (where R9 and R12 are circuit breakers in this case for illustrative purposes only, normally circuit breakers at the substation do not serve as tie switches) that maintain the radial feeder configuration in the system, all other switches are normally closed switches to transfer electric power from substations to loads along feeder circuits. Though not shown in FIG. 10, each switch in the system is associated with an IED for the monitoring and protection purpose. As discussed above, IEDs may communicate with a feeder automation controller located, for example, in a substation.

To illustrate the feeder automation procedure of the present invention, assume a permanent fault occurs at load node L3. The IED associated with switch R3, which is the closest upstream switch to this fault location, senses the fault current, and based on the predefined protective setting, controls switch R3 to open. If switch R3 is a recloser, a reclosing sequence will follow the initial switch open operation, i.e., the IED will control switch R3 to reclose and open for several times. After the reclosing sequence finishes, if the IED continues to sense the fault current, a permanent fault is recognized and switch R3 is set to lockout (open) status. Note that the open, reclosing, and lockout sequence of switch R3 is implemented by the associated IED automatically without the control from the master controller.

After the master controller receives the lockout information of switch R3, the feeder automation procedure identifies fault location, isolates the faulty feeder section, and restores loads connected to the downstream healthy section from alternative substations. First, based on the lockout information of switch R3, the master controller identifies the fault location, which is the feeder section between the lockout switch R3 and its downstream switches R6 and R10. Next, derived from the fault location, the isolation algorithm in the master controller determines that two downstream switches R6 and R10 are isolation switches and sends open switch commands to the IEDs associated with the two downstream switches. Opening downstream switches R6 and R10 isolates the faulty feeder section and results in two un-served load areas including downstream loads L5, L6, L7, L8, and L9. Finally, the load restoration algorithm in the master controller is executed to generate restoration solutions based on the post-fault system configuration and capacity constraints of substations, feeders, and switches: (1) substation 3 restores loads L5 and L6 by closing switch R3 and (2) substation 4 restores loads L8 and L9 by closing switch R12.

In the feeder automation algorithm of the present invention, the fault location identification and the fault isolation are relatively easy to achieve in the manner discussed above, while the search for a load restoration solution can become very complex, depending on the distribution system configuration and capacity constraints of various devices such as substations, feeders, and switches. For example, some network configurations have no single-path restoration solution available and multiple alternative substation-feeder paths for restoration have to be considered.

The present invention provides a multi-path load restoration solution to automatically restore as much load as possible after the occurrence and isolation of faults in electric power distribution systems. Generally, for each isolated load area, the restoration logic generation method of the present invention searches for a single-path restoration strategy first. If no feasible single-path restoration strategy exists, the method then identifies appropriate switches that may be opened to separate the isolated load area into two or more sub-networks, so that the un-served loads inside each sub-network may be restored from an appropriate back-feed path. If a particular restoration strategy actuates a number of network separation switches, no attempt is made to find a strategy with more network separation switches. In this manner, the number of switch operations is minimized. Moreover, a load balancing (of power restoration paths) algorithm may be applied when more than one path is required to restore power.

Figure 11:
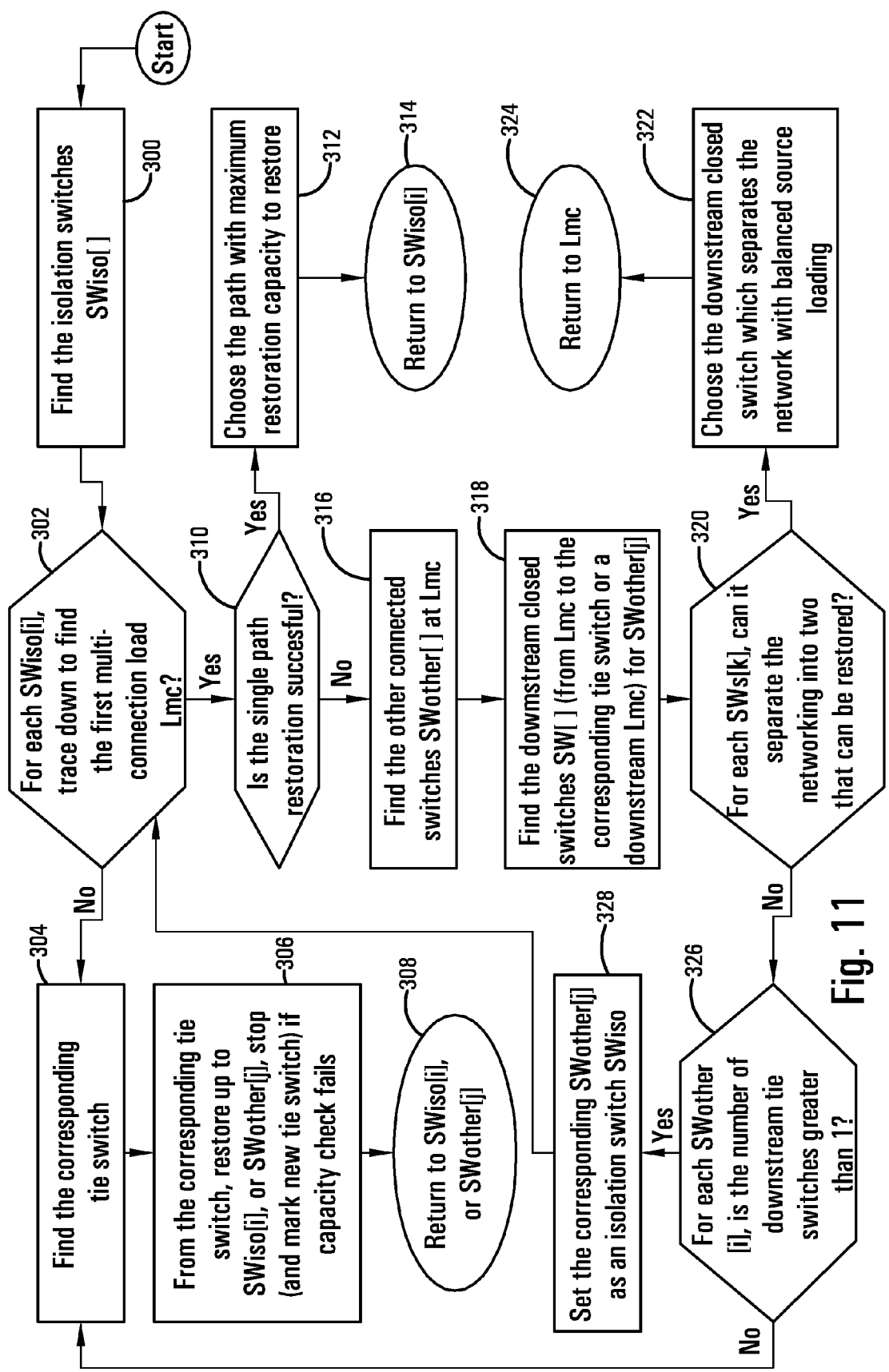
FIG. 11 shows the multi-path load restoration algorithm according to the present invention.

The flow chart of this multi-path load restoration algorithm is shown in FIG. 11. The restoration procedure begins after isolation switches are opened to complete the fault isolation step. In one or more embodiments, fault isolation is completed according to the connectivity matrix method described above. In a first step 300, each isolation switch SWiso[i] is identified. As should be understood, the algorithm of the present invention is recursive and thus, for each isolation switch, the algorithm of FIG. 11 is repeated, beginning at 302. At step 302, for a given SWiso[i], the restoration algorithm searches downstream for a first multi-connection load node (hereinafter "Lmc"). An Lmc is a load node that connects to more than one downstream switch.

If no Lmc is found, this indicates that only one load restoration source is available for the particular isolated un-served load. The corresponding tie-switch for this source is located at 304. From the corresponding tie-switch, at step 306 loads are restored up to SWiso[i] depending upon the capacity of the source. If a capacity check fails, a new tie switch is opened to segregate the load that is beyond the capacity of the source. Thereafter, the algorithm recursively returns to the next SWiso[ ] at 308.

If an Lmc is located, at 310 the algorithm determines whether one or more single substation-feeder restoration paths individually has sufficient capacity to restore all loads. If an individual pathway is available, at 312, the substation-feeder path with the maximum restoration capacity is selected to restore all loads. The restoration algorithm then returns recursively to the next SWiso[ ].

If no single path has sufficient capacity, the algorithm identifies the immediate downstream switches connected to the Lmc, and stores them in vector SWother[ ] at 316. At 318, the algorithm traces downstream from each SWother[ ] to identify closed switches, which are stored in vector SWs[ ]. The trace from each SWother[ ] continues until reaching a tie-switch or downstream second Lmc node. At 320, by simulating the opening of each switch SWs[ ], the restoration algorithm determines whether the network can be divided into two sub-networks, in which un-served loads can be restored respectively. If any of the switches SWs[ ], when opened, separates the network into two sub-networks capable of being powered by individual sources, the switch SWs[ ] that best balances the loading levels of the restoration sources is selected at 322. Thereafter, at 324 the system returns recursively to the next isolation switch at 302.

If no switch is found that satisfies the criteria set forth in step 320, then for each switch in SWother[ ], at 326 it is determined whether the number of its downstream tie-switches is greater than 1, which indicates that another Lmc node exists downstream. If the number of downstream tie-switches is greater than one for a particular SWother[ ], that SWother[j] is treated as an isolation switch SWiso at step 328, and the algorithm starts begins from 302 recursively.

If a switch SWs[ ] that does not have more than one downstream tie-switch, this indicates that only one load restoration source is available for the particular isolated un-served load. The corresponding tie-switch for this source is located at 304. From the corresponding tie-switch, at step 306 loads are restored up to SWother[ ] depending upon the capacity of the source. If a capacity check fails, a new tie switch is opened to segregate the load that is beyond the capacity of the source. Thereafter, the algorithm recursively returns to the next SWother[ ] at 308.

As a result of the multi-path restoration algorithm, a set of switch operations is generated, which includes the list of switches that should be opened and closed. The switch open/close operations result in a new system configuration that optimally restores the un-served loads from one or more substation-feeder paths.

Figure 12:
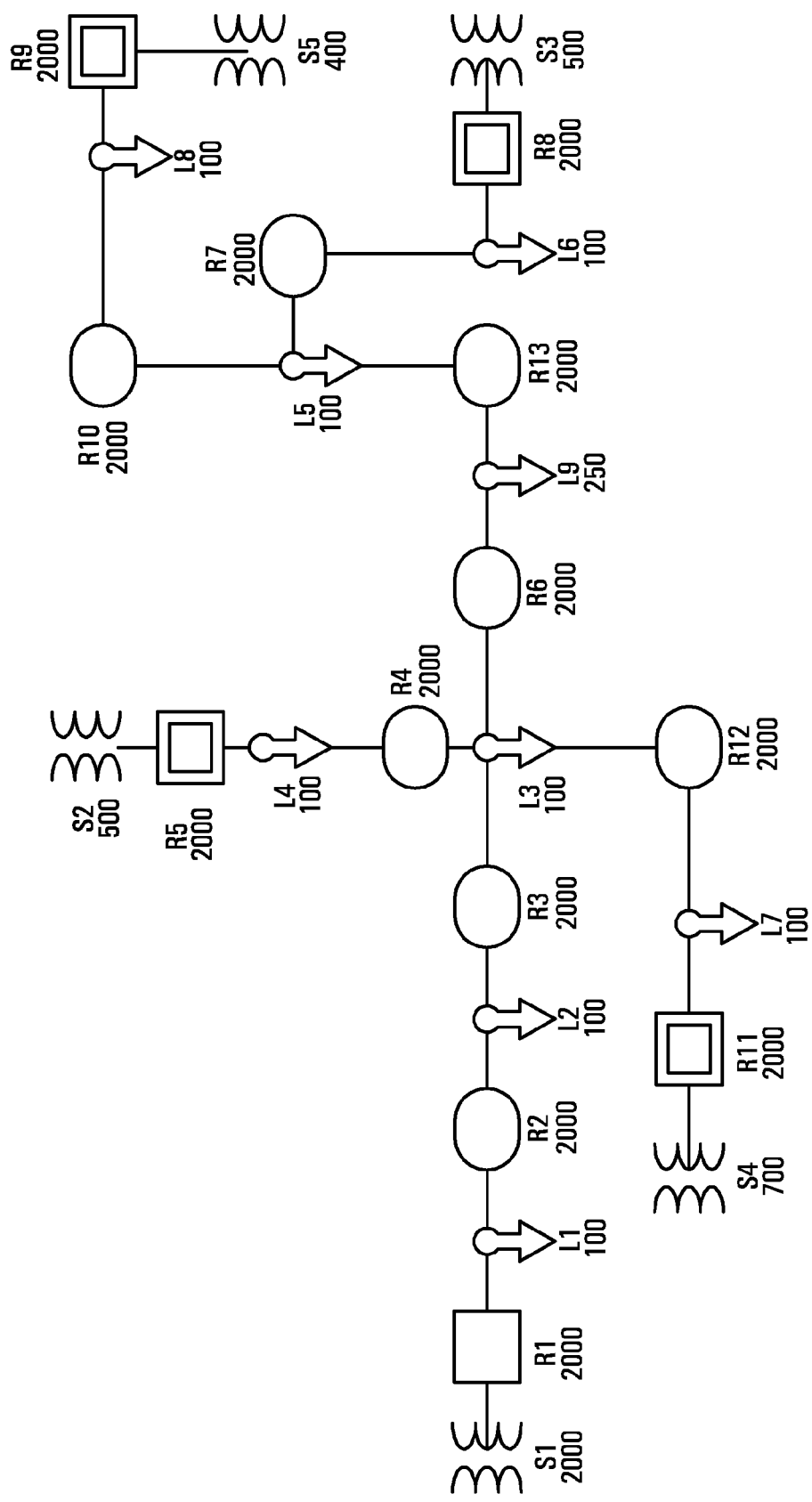
FIG. 12 shows a third exemplary power network according to the present invention.

An exemplary distribution system is shown in FIG. 12, which demonstrates the multi-path load restoration method. This example distribution system includes five substations, thirteen switches, and nine loads. The IEDs associated with the switches and master controller are not shown. The capacities of substations and switches are represented with current magnitudes in terms of the unit Ampere (amp), and each load is represented with a constant current load model. For example, the maximum capacity of substation S1 is 2000 amp, the maximum capacity of switch R1 is 2000 amp, and the load amount of L1 100 amp.

For simplicity, all switch capacities are larger than the substation capacities. Thus, the substation capacities are the major capacity constraints in selecting restoration paths. It should be appreciated that such assumptions are merely exemplary, and the capacity check of the present invention encompasses both capacity constraints and switch capacities. In addition, for purposes of the present example, it is presumed all other system operating constraints such as feeder power flows and the voltage drop along feeder circuits are within predefined ranges after system configuration changes.

As shown in FIG. 12, substation S1 supplies power to all loads in the system. Switches R5, R8, R9, and R11 are normally open tie-switches that maintain the radial system configuration. If a permanent fault occurs at load node L1, switch R1 is set to lockout open status after a reclosing sequence. Thereafter, switch R2 opens to isolate the faulty section. Because of the lockout and isolation, loads L2-L9 are unserved. In this distribution network, substations 2-5 (S2-S5) are available to provide alternative power.

Based on the restoration method of the present invention, the restoration logic generation algorithm finds the isolation switch R2. Next, from switch R2, the Lmc (lode node L3) located downstream is identified. Next, a search is performed for a single substation-feeder path that has sufficient capacity to restore all loads. In this particular system, the total unserved load amount after the fault isolation is 950 amp (the sum of loads L2~L9), each switch has a capacity limit of 2000 amp, which is greater than the total unserved load amount. Therefore, only the alternative substation capacities need be considered in selecting an appropriate restoration path. All alternative substation sources (i.e., S2: 500 amp, S3: 500 amp, S4: 700 am, S5: 400 amp) are less than the total load amount of 950 amp. Thus, no single substation-feeder path can restore all the unserved loads.

Because no single restoration path can restore all loads, the restoration logic generation algorithm then searches the downstream switches (SWother) which are directly connected to L3, which include R4, R6, and R12, as well as all the downstream closed switches (SWs) from the Lmc (L3) to a downstream tie-switch or a downstream Lmc, which include R4, R6, R13, and R12. Among the four switches (SWs), if R4, R6, or R12 is opened, the unserved loads in each generated subnetwork can not be restored completely. If switch R13 is opened to separate the unserved load area into two subnetworks, each subnetwork can be restored. Therefore, switch R13 is selected as the switch to be opened in the restoration solution. FIG. 14 shows the subnetwork information created by opening different switches, including their maximum substation capacities, total unserved load amounts in their ranges, and whether unserved loads can be restored completely.

Figure 13:
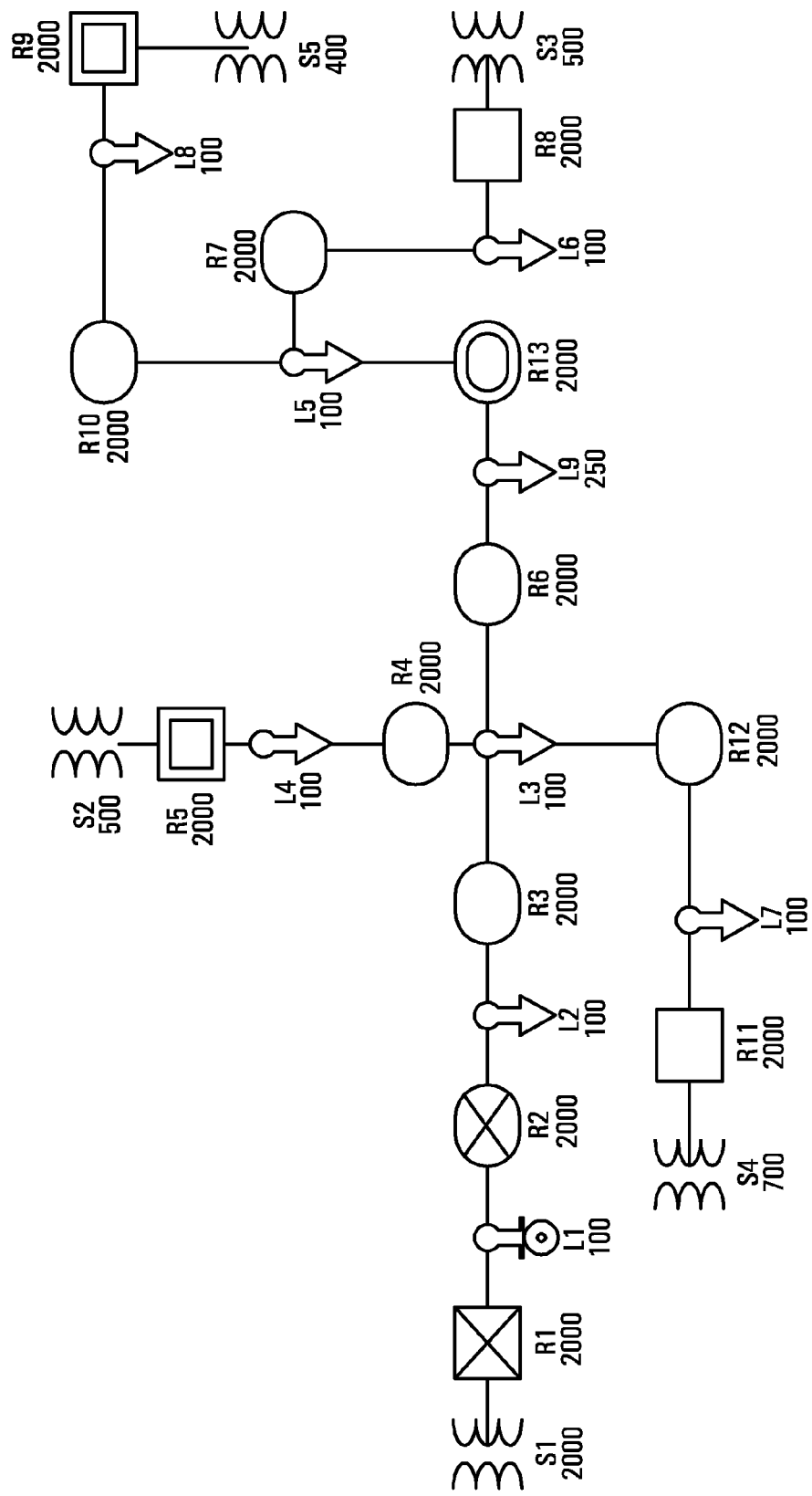
FIG. 13 shows the third exemplary power network of FIG. 12 with a simulated fault at load node L1 and the post-restoration network status.

When switch R13 is opened, the unserved loads (L2, L3, L4, and L12) in the subnetwork on the left side (subnetwork 1) are restored by substation 4 (S4) by closing switch R11, because substation 4 (S4) has larger capacity than substation 2 (S2) in the same subnework. For the same reason, the unserved loads in the subnetwork on the right side (subnetwork 2) are powered by substation 3 (S3) by closing switch R8. The switch open/close operation sequence as a result of the restoration algorithm is to open switch R13, and then close switches R8 and R11. The post-restoration system configuration is shown in FIG. 13. This restoration sequence is then implemented by the power restoration controllers 13 to tell the IEDs 14 to control the operation of switches, and finally the post-restoration system configuration is reached.

Figure 15:
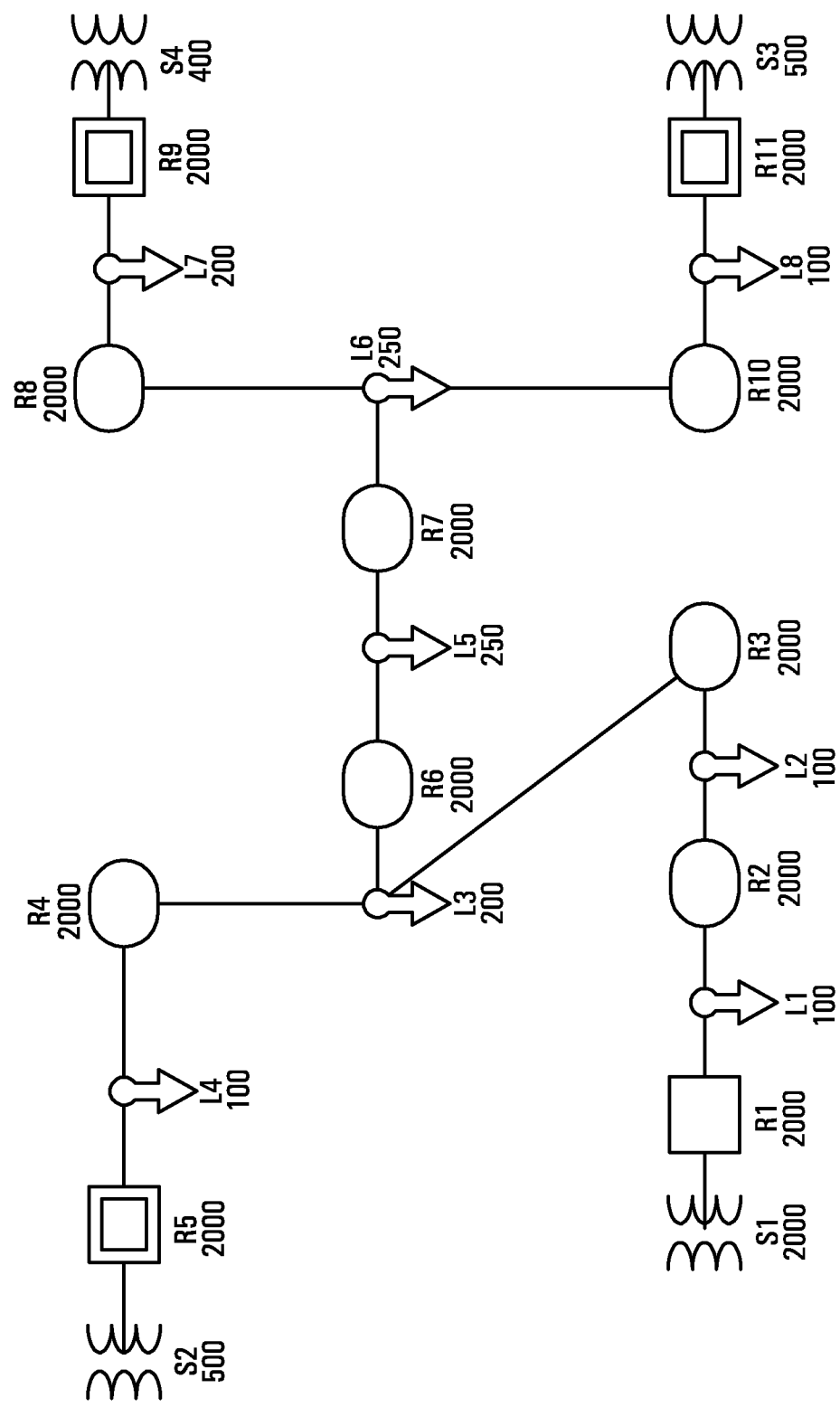
FIG. 15 shows a fourth exemplary power network according to the present invention.

To illustrate the more advanced feature of the multi-path load restoration logic generation algorithm, FIG. 15 shows an alternate exemplary distribution system. This example distribution system includes four substations, eleven switches, and eight loads. As discussed above, the IEDs associated with the switches and master controller are not shown. The capacities of substations and the loading capability of the switches are represented with current magnitudes in terms of the unit Ampere (amp), and each load is represented with a constant current load model. These quantities are shown below each substation, switch, and load.

For simplification purposes, all switch capacities are assumed to be far larger than the substation capacities so that the substation capacities are the major capacity constraints in selecting restoration paths. In addition, to simplify the restoration problem, it is assumed that all other system operating constraints such as feeder power flows and the voltage drop along feeder circuits are within predefined ranges after system configuration change.

Switches R5, R9, and R11 (ex. circuit breakers) are normally open tie-switches that maintain the radial system configuration. If a permanent fault occurs at load node L1, switch R1 goes to a lockout open status after a reclosing sequence, and switch R2 is instructed to open, thereby isolating the faulty section. This lockout and isolation leaves loads L2~L8 unserved. In this distribution network, three other alternative sources (S2-S4) exist.

Based on the restoration method of the present invention, the restoration logic generation algorithm searches for the first Lmc (i.e., load node L3) located downstream of isolation switch R2. Next it determined whether any single substation-feeder path has sufficient capacity to restore all loads. In this particular system, the total unserved load amount after the fault isolation is 1200 amp (the sum of loads L2~L8), each switch has a capacity limit of 2000 amp, which is greater than the total unserved load amount. Therefore, for capacity purposes, when selecting restoration paths in the present example, only the substation capacities need be considered. All alternative substation sources (i.e., S2: 500 amp, S3: 500 amp, S4: 400 amp) provide less capacity than the total load amount needed (1200 amp). Thus, no single substation-feeder path can restore all the unserved loads.

The restoration logic generation algorithm next determines which downstream switches (SWother) directly connect to L3, including R4 and R6, and which closed switches (SWs) connect between Lmc (L3) and a downstream tie-switch or Lmc (L6), including R4, R6, and R7.

Next the algorithm determines that opening R4, R6, or R7 will not separate the unserved network into two sub-networks for single-path restoration (FIG. 16). Next the restoration logic generation algorithm determines whether another Lmc exists (L6), and if so, treats the SWother directly upstream (R6) as an isolation (open) switch. By treating R6 as an isolation switch the methods of the algorithm can be called recursively. Now the concerned network includes R7-R11, L5-L8, and S3-S4. For exemplary purposes, this network is referred to as NtWrk1.

For NtWrk1, the restoration algorithm begins recursively, and determines that an Lmc (L6) is downstream of the isolation switch. Next, it is determined that single-path restoration is infeasible because the total unserved load of NtWrk1 is 800 amp and the maximum source capacity of S3 and S4 is 500 amp. Next, restoration logic generation algorithm determines which downstream switches (SWother) directly connect to L6, including R8 and R10, and which closed switches (SWs) connect between Lmc (L6) and a downstream tie-switch or Lmc, including R8 and R10.

Next the algorithm determines that opening R8 or R10 will not separate the unserved network NtWrk1 into two sub-networks for single-path restoration. Next the restoration logic generation algorithm determines that no other Lmc exists. Because no other Lmc exists downstream of L6, the algorithm determines, from each SWother, the corresponding downstream tie switch. For R8, the corresponding tie switch is R9 and for R10, the corresponding tie switch is R11. From tie switch R9, S4 is capable of restoring up to L7, and thus R9 is closed and R8 is open. From tie switch R11, S3 is capable of restoring up to L6, and thus R11 is closed and R7 is opened.

Now that NtWrk1 is configured, the algorithm deals with Lmc L3. As discussed above, from L3, R6 was set as an isolation switch because it connected to a downstream Lmc. The remaining SWother of Lmc L3 is R4. Because R4 includes no downstream Lmc, the algorithm finds the corresponding downstream tie switch R5. From the corresponding tie switch R5, S2 is capable of restoring up to L2, and thus R5 is closed and R2 (the original isolation switch) remains opened. The remaining capacity is 100 amp, not enough to restore L5, so R6 is set to open.

Figure 17:
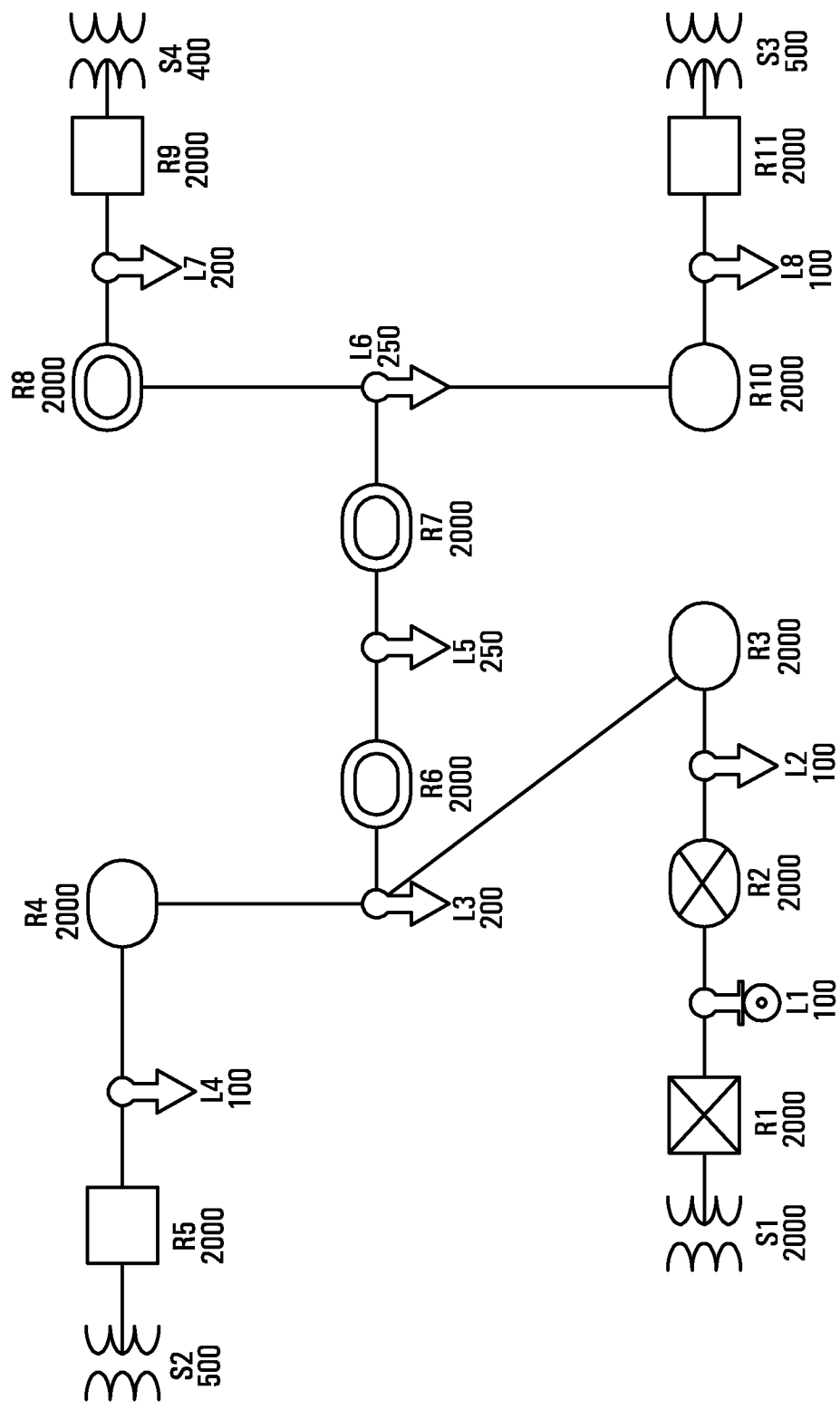
FIG. 17 shows the fourth exemplary power network of FIG. 15 after load restoration for a fault at load node L1.

Overall, since no single-path restoration is feasible, the proposed algorithm will use the alternative sources strategically and restore as much load as possible. The resulting post-restoration system configuration is shown in FIG. 17.

The present invention may be embodied as or take the form of the method and system previously described, as well as of a computer readable medium having computer-readable instructions stored thereon which, when executed by a processor, carry out the operations of the present invention. The computer-readable medium may be any medium that can contain, store, communicate, propagate, or transport the user-interface program instruction for use by or in connection with the instruction execution system, apparatus, or device and may by way of example but without limitation, be an electronic, magnetic, optical, electromagnetic, infrared, or semi-conductor system, apparatus, device, or propagation medium or other suitable medium upon which the program is printed. More specific examples (a non-exhaustive list) of the computer-readable medium would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the present invention may be written in any suitable programming language provided it allows achieving the previously described technical results.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method of restoring power in a power distribution network having a plurality of power sources, a plurality of loading zones, a plurality of switching devices interconnected between the plurality of power sources and the plurality of loading zones, an intelligent electronic device associated with each of the plurality of switching devices to control the switching devices, the method comprising:
   providing at least one power restoration controller in communication with the intelligent electronic devices;
   defining at least one base network state;
   creating power restoration logic for said at least one base network state;
   simulating the power restoration logic for said at least one base network state; and
   transmitting the power restoration logic to the at least one power restoration controller which thereafter monitors and controls the intelligent electronic devices.

2. The method according to claim 1 wherein defining at least one base network state includes defining a plurality of base network states.

3. The method according to claim 2 wherein creating power restoration logic for a plurality of base network states includes, for each base network state, automatically generating power restoration logic for a simulated single permanent fault at each of the loading zones.

4. The method according to claim 3 further comprising isolating a permanently faulted loading zone and implementing the restoration logic correlating to the permanent fault at the faulted loading zone.

5. The method according to claim 1 wherein defining at least one base network state includes defining loading capacity of the plurality of switching devices and the plurality of power sources and defining a network topology interrelating the plurality of switching devices and plurality of power sources.

6. The method according to claim 5 wherein the base network states are defined for a plurality of electric power usage patterns.

7. The method according to claim 6 wherein a first base network state is defined for summer electric power usage patterns and a second base network state is defined for winter electric power usage patterns.

8. The method according to claim 5 further comprising validating that the at least one base network state does not violate radial load requirements or capacity constraints.

9. The method according to claim 1 wherein creating power restoration logic for each base network state comprises automatically generating the restoration logic, displaying the restoration logic to a user, and allowing the restoration logic to be modified by the user.

10. The method according to claim 1 wherein creating power restoration logic for each base network state comprises:
    creating a study network of un-served loads after fault isolation;
    simulating the opening of all switching devices in the network;
    moving downstream from each of the simulated power sources and closing one switching device at a time;
    computing the remaining available capacity, and if the remaining available capacity is inadequate, marking the last opened switching device as a tie-switch, otherwise, continuing until a tie-switch or multi-source loading zone is reached;
    using the simulated power source with the maximum remaining available capacity for any multi-source supplied loading zone reached by more than one power source; and
    marking all switching devices connected to the multi-source loading zone from power sources other than the power source having the maximum remaining available capacity as tie-switches.

11. The method according to claim 1 wherein simulating the power restoration logic comprises simulating a fault at each loading zone.

12. The method according to claim 11 wherein the simulation is visually displayed to a user.

13. The method according to claim 1 further comprising generating and executing power restoration logic dynamically.

14. The method according to claim 13 wherein generating and executing power restoration logic dynamically comprises dynamically generating power restoration logic if a fault occurs when the power distribution network is not configured in the at least one base network state.

15. The method according to claim 14 wherein, when dynamically generating power restoration logic and more than one alternate source is available, choosing the source according to either predefined path user preferences or a capacity reservation factor.

16. The method according to claim 14 wherein, when dynamically generating power restoration logic and more than one alternate source is available, choosing the source with the largest priority value, wherein the priority value is calculated according to:

$$AltPriority(i)=AltPathPriority(i)*PF+AvailCapacityFactor(i)*(1-PF);$$

where AvailCapacityFactor(i) is the post-restoration available capacity reservation factor of the corresponding alternative power restoration path i, and AltPathPriority (i) is a user defined priority setting of an alternative power restoration path i, and PF is a user defined preference factor.

17. The method according to claim 16 wherein AvailCapacityFactor(i) is computed according to:

$$AvailCapacityFactor(i)=(Capacity-TotalLoad)/Capacity$$

where Capacity is the source capacity of the alternative power restoration path i, and TotalLoad is the total load of the source after the restoration.

18. The method according to claim 1 further comprising providing at least one power restoration logic generator in communication with the at least one power restoration controller, wherein the power restoration logic is transmitted from the power restoration logic generator to the at least one power restoration controller.

19. The method according to claim 1 wherein:
the power restoration logic comprises a switch position condition for at least one of the plurality of switching devices and at least one switch operation for the plurality of switching devices for when the switch position condition is met; and
the at least one power restoration controller monitoring and controlling the intelligent electronic devices comprises the at least one power restoration controller:
receiving from the intelligent electronic devices switch position information for the switching devices,
monitoring the received switch position information for switch position information that meets the switch position condition, and
when the switch position condition has been met by the switch position information, sends a switch operation command to at least one of the intelligent electronic devices to control at least one of the switching devices associated with the at least one of the intelligent electronic devices to perform the at least one switch operation.

20. The method according to claim 1 wherein one of the plurality of loading zones is in a faulted state, the method further comprising:
isolating the loading zone that is in a faulted state;
identifying one or more un-served load networks including loading zones downstream from the loading zone in a faulted state;
restoring power to each un-served load network from a single power source;
opening the switch or switches that separate each un-served load network into two or more sub-networks if no single power source is capable of restoring power to the un-served load network; and
restoring power to each said sub-network from a single power source, until the source capacity is exhausted or switch loading capacity is violated.

21. The method according to claim 20 wherein opening the switch or switches that separate each un-served load network into two or more sub-networks comprises:
determining if more than one switch configuration is capable of separating the un-served load network to the two or more sub-networks; and
selecting the switch configuration that best balances loads of the power sources restoring power to each sub-network.

22. The method according to claim 20 wherein opening the switch or switches that separate each un-served load network into two or more sub-networks comprises:
determining if more than one switch configuration is capable of separating the un-served load network to the two or more sub-networks; and
selecting the switch configuration based on user defined preferences.

23. A method of restoring power in a power distribution network having a plurality of power sources, a plurality of loading zones, a plurality of switching devices interconnected between the plurality of power sources and the plurality of loading zones, an intelligent electronic device associated with each of the plurality of switching devices to control the switching devices, the method comprising:
providing at least one power restoration controller in communication with the intelligent electronic devices;
defining at least one base network state;
creating power restoration logic for said at least one base network state, wherein the power restoration logic comprises a switch position condition for at least one of the plurality of switching devices and at least one switch operation for the plurality of switching devices for when the switch position condition is met;
simulating the power restoration logic for said at least one base network state;
transmitting the power restoration logic to the at least one power restoration controller; and
the at least one power restoration controller receiving switch position information for the plurality of switching devices, comparing the switch position information to the switch position condition, and sending a switch operation command to at least one of the intelligent electronic devices to control at least one of the switching devices associated therewith to perform the at least one switch operation when the switch position information has met the switch position condition.

* * * * *